United States Patent
Guo et al.

(10) Patent No.: US 10,891,256 B2
(45) Date of Patent: *Jan. 12, 2021

(54) METHOD AND APPARATUS FOR A VECTOR MEMORY SUBSYSTEM FOR USE WITH A PROGRAMMABLE MIXED-RADIX DFT/IDFT PROCESSOR

(71) Applicant: Cavium, LLC, Santa Clara, CA (US)

(72) Inventors: Yuanbin Guo, Mountain House, CA (US); Hong Jik Kim, San Jose, CA (US)

(73) Assignee: Cavium, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,470

(22) Filed: Feb. 11, 2019

(65) Prior Publication Data
US 2019/0171613 A1  Jun. 6, 2019

Related U.S. Application Data

(63) Continuation of application No. 15/292,015, filed on Oct. 12, 2016, now Pat. No. 10,311,018, which is a continuation-in-part of application No. 15/272,332, filed on Sep. 21, 2016, now Pat. No. 10,210,135.

(60) Provisional application No. 62/279,345, filed on Jan. 15, 2016, provisional application No. 62/274,686, filed on Jan. 4, 2016, provisional application No. 62/274,062, filed on Dec. 31, 2015.

(51) Int. Cl.
*G06F 15/80* (2006.01)
*G06F 9/30* (2018.01)
*G06F 17/14* (2006.01)

(52) U.S. Cl.
CPC ...... *G06F 15/8061* (2013.01); *G06F 9/30036* (2013.01); *G06F 17/141* (2013.01); *G06F 17/142* (2013.01)

(58) Field of Classification Search
None
See application file for complete search history.

(56) References Cited

U.S. PATENT DOCUMENTS

| | | | | |
|---|---|---|---|---|
| 2007/0266070 A1* | 11/2007 | Sung | ...... | G06F 17/142 708/404 |
| 2008/0071848 A1* | 3/2008 | Baireddy | ...... | G06F 17/142 708/404 |
| 2010/0174769 A1* | 7/2010 | Modlin | ...... | G06F 17/142 708/404 |

(Continued)

*Primary Examiner* — Michael D. Yaary
(74) *Attorney, Agent, or Firm* — JW Law Group; James M. Wu

(57) ABSTRACT

A vector memory subsystem for use with a programmable mix-radix vector processor ("PVP") capable of calculating discrete Fourier transform ("DFT/IDFT") values. In an exemplary embodiment, an apparatus includes a vector memory bank and a vector memory system (VMS) that generates input memory addresses that are used to store input data into the vector memory bank. The VMS also generates output memory addresses that are used to unload vector data from the memory banks. The input memory addresses are used to shuffle the input data in the memory bank based on a radix factorization associated with an N-point DFT, and the output memory addresses are used to unload the vector data from the memory bank to compute radix factors of the radix factorization.

20 Claims, 24 Drawing Sheets

(56) References Cited

U.S. PATENT DOCUMENTS

2014/0280420 A1\* 9/2014 Khan .................... G06F 9/3001
708/404

\* cited by examiner

300

| INDEX | 34 | 33 | 32 | 31 | 30 | 29 | 28 |
|---|---|---|---|---|---|---|---|
| $N_{RB}^{UL}$ | 108 | 100 | 96 | 90 | 81 | 80 | 75 |
| N_DFT | 1296 | 1200 | 1152 | 1080 | 972 | 960 | 900 |

| INDEX | 27 | 26 | 25 | 24 | 23 | 22 | 21 |
|---|---|---|---|---|---|---|---|
| $N_{RB}^{UL}$ | 72 | 64 | 60 | 54 | 50 | 48 | 45 |
| N_DFT | 864 | 768 | 720 | 648 | 600 | 576 | 540 |

| INDEX | 20 | 19 | 18 | 17 | 16 | 15 | 14 |
|---|---|---|---|---|---|---|---|
| $N_{RB}^{UL}$ | 40 | 36 | 32 | 30 | 27 | 25 | 24 |
| N_DFT | 480 | 432 | 384 | 360 | 324 | 300 | 288 |

| INDEX | 13 | 12 | 11 | 10 | 9 | 8 | 7 |
|---|---|---|---|---|---|---|---|
| $N_{RB}^{UL}$ | 20 | 18 | 16 | 15 | 12 | 10 | 9 |
| N_DFT | 240 | 216 | 192 | 180 | 144 | 120 | 108 |

| INDEX | 6 | 5 | 4 | 3 | 2 | 1 | 0 |
|---|---|---|---|---|---|---|---|
| $N_{RB}^{UL}$ | 8 | 6 | 5 | 4 | 3 | 2 | 1 |
| N_DFT | 96 | 72 | 60 | 48 | 36 | 24 | 12 |

| SIMDIndx OffsetAddr | W0 | W1 | W2 | W3 | W4 | W5 | W6 | W7 | W8 | W9 | W10 | W11 |
|---|---|---|---|---|---|---|---|---|---|---|---|---|
| 0 | 0 | 1 | 2 | 3 | 4 | 5 | 6 | 7 | 8 | 9 | 10 | 11 |
| 1 | 240 | 241 | 242 | 243 | 244 | 245 | 246 | 247 | 248 | 249 | 250 | 251 |
| 2 | 480 | 481 | 482 | 483 | 484 | 485 | 486 | 487 | 488 | 489 | 490 | 491 |
| 3 | 720 | 721 | 722 | 723 | 724 | 725 | 726 | 727 | 728 | 729 | 730 | 731 |
| 4 | 960 | 961 | 962 | 963 | 964 | 965 | 966 | 967 | 968 | 969 | 970 | 971 |
| 5 | 48 | 49 | 50 | 51 | 52 | 53 | 54 | 55 | 56 | 57 | 58 | 59 |
| 6 | 288 | 289 | 290 | 291 | 292 | 293 | 294 | 295 | 296 | 297 | 298 | 299 |
| 7 | 528 | 529 | 530 | 531 | 532 | 533 | 534 | 535 | 536 | 537 | 538 | 539 |
| 8 | 768 | 769 | 770 | 771 | 772 | 773 | 774 | 775 | 776 | 777 | 778 | 779 |
| 9 | 1008 | 1009 | 1010 | 1011 | 1012 | 1013 | 1014 | 1015 | 1016 | 1017 | 1018 | 1019 |
| 10 | 96 | 97 | 98 | 99 | 100 | 101 | 102 | 103 | 104 | 105 | 106 | 107 |
| 11 | 336 | 337 | 338 | 339 | 340 | 341 | 342 | 343 | 344 | 345 | 346 | 347 |
| 12 | 576 | 577 | 578 | 579 | 580 | 581 | 582 | 583 | 584 | 585 | 586 | 587 |
| 13 | 816 | 817 | 818 | 819 | 820 | 821 | 822 | 823 | 824 | 825 | 826 | 827 |
| 14 | 1056 | 1057 | 1058 | 1059 | 1060 | 1061 | 1062 | 1063 | 1064 | 1065 | 1066 | 1067 |
| 15 | 144 | 145 | 146 | 147 | 148 | 149 | 150 | 151 | 152 | 153 | 154 | 155 |
| 16 | 384 | 385 | 386 | 387 | 388 | 389 | 390 | 391 | 392 | 393 | 394 | 395 |
| 17 | 624 | 625 | 626 | 627 | 628 | 629 | 630 | 631 | 632 | 633 | 634 | 635 |
| 18 | 864 | 865 | 866 | 867 | 868 | 869 | 870 | 871 | 872 | 873 | 874 | 875 |
| 19 | 1104 | 1105 | 1106 | 1107 | 1108 | 1109 | 1110 | 1111 | 1112 | 1113 | 1114 | 1115 |
| 20 | 192 | 193 | 194 | 195 | 196 | 197 | 198 | 199 | 200 | 201 | 202 | 203 |
| 21 | 432 | 433 | 434 | 435 | 436 | 437 | 438 | 439 | 440 | 441 | 442 | 443 |
| 22 | 672 | 673 | 674 | 675 | 676 | 677 | 678 | 679 | 680 | 681 | 682 | 683 |
| 23 | 912 | 913 | 914 | 915 | 916 | 917 | 918 | 919 | 920 | 921 | 922 | 923 |
| 24 | 1152 | 1153 | 1154 | 1155 | 1156 | 1157 | 1158 | 1159 | 1160 | 1161 | 1162 | 1163 |
| 25 | 12 | 13 | 14 | 15 | 16 | 17 | 18 | 19 | 20 | 21 | 22 | 23 |
| 26 | 252 | 253 | 254 | 255 | 256 | 257 | 258 | 259 | 260 | 261 | 262 | 263 |
| 27 | 492 | 493 | 494 | 495 | 496 | 497 | 498 | 499 | 500 | 501 | 502 | 503 |
| 28 | 732 | 733 | 734 | 735 | 736 | 737 | 738 | 739 | 740 | 741 | 742 | 743 |
| 29 | 972 | 973 | 974 | 975 | 976 | 977 | 978 | 979 | 980 | 981 | 982 | 983 |
| 30 | 60 | 61 | 62 | 63 | 64 | 65 | 66 | 67 | 68 | 69 | 70 | 71 |
| 31 | 300 | 301 | 302 | 303 | 304 | 305 | 306 | 307 | 308 | 309 | 310 | 311 |
| 32 | 540 | 541 | 542 | 543 | 544 | 545 | 546 | 547 | 548 | 549 | 550 | 551 |
| 33 | 780 | 781 | 782 | 783 | 784 | 785 | 786 | 787 | 788 | 789 | 790 | 791 |
| 34 | 1020 | 1021 | 1022 | 1023 | 1024 | 1025 | 1026 | 1027 | 1028 | 1029 | 1030 | 1031 |
| 35 | 108 | 109 | 110 | 111 | 112 | 113 | 114 | 115 | 116 | 117 | 118 | 119 |
| 36 | 348 | 349 | 350 | 351 | 352 | 353 | 354 | 355 | 356 | 357 | 358 | 359 |
| 37 | 588 | 589 | 590 | 591 | 592 | 593 | 594 | 595 | 596 | 597 | 598 | 599 |
| 38 | 828 | 829 | 830 | 831 | 832 | 833 | 834 | 835 | 836 | 837 | 838 | 839 |

FIG. 16B

| SIMDIndx OffsetAddr | W0 | W1 | W2 | W3 | W4 | W5 | W6 | W7 | W8 | W9 | W10 | W11 |
|---|---|---|---|---|---|---|---|---|---|---|---|---|
| 39 | 1068 | 1069 | 1070 | 1071 | 1072 | 1073 | 1074 | 1075 | 1076 | 1077 | 1078 | 1079 |
| 40 | 156 | 157 | 158 | 159 | 160 | 161 | 162 | 163 | 164 | 165 | 166 | 167 |
| 41 | 396 | 397 | 398 | 399 | 400 | 401 | 402 | 403 | 404 | 405 | 406 | 407 |
| 42 | 636 | 637 | 638 | 639 | 640 | 641 | 642 | 643 | 644 | 645 | 646 | 647 |
| 43 | 876 | 877 | 878 | 879 | 880 | 881 | 882 | 883 | 884 | 885 | 886 | 887 |
| 44 | 1116 | 1117 | 1118 | 1119 | 1120 | 1121 | 1122 | 1123 | 1124 | 1125 | 1126 | 1127 |
| 45 | 204 | 205 | 206 | 207 | 208 | 209 | 210 | 211 | 212 | 213 | 214 | 215 |
| 46 | 444 | 445 | 446 | 447 | 448 | 449 | 450 | 451 | 452 | 453 | 454 | 455 |
| 47 | 684 | 685 | 686 | 687 | 688 | 689 | 690 | 691 | 692 | 693 | 694 | 695 |
| 48 | 924 | 925 | 926 | 927 | 928 | 929 | 930 | 931 | 932 | 933 | 934 | 935 |
| 49 | 1164 | 1165 | 1166 | 1167 | 1168 | 1169 | 1170 | 1171 | 1172 | 1173 | 1174 | 1175 |
| 50 | 24 | 25 | 26 | 27 | 28 | 29 | 30 | 31 | 32 | 33 | 34 | 35 | ← 1606 |
| 51 | 264 | 265 | 266 | 267 | 268 | 269 | 270 | 271 | 272 | 273 | 274 | 275 |
| 52 | 504 | 505 | 506 | 507 | 508 | 509 | 510 | 511 | 512 | 513 | 514 | 515 |
| 53 | 744 | 745 | 746 | 747 | 748 | 749 | 750 | 751 | 752 | 753 | 754 | 755 |
| 54 | 984 | 985 | 986 | 987 | 988 | 989 | 990 | 991 | 992 | 993 | 994 | 995 |
| 55 | 72 | 73 | 74 | 75 | 76 | 77 | 78 | 79 | 80 | 81 | 82 | 83 |
| 56 | 312 | 313 | 314 | 315 | 316 | 317 | 318 | 319 | 320 | 321 | 322 | 323 |
| 57 | 552 | 553 | 554 | 555 | 556 | 557 | 558 | 559 | 560 | 561 | 562 | 563 |
| 58 | 792 | 793 | 794 | 795 | 796 | 797 | 798 | 799 | 800 | 801 | 802 | 803 |
| 59 | 1032 | 1033 | 1034 | 1035 | 1036 | 1037 | 1038 | 1039 | 1040 | 1041 | 1042 | 1043 |
| 60 | 120 | 121 | 122 | 123 | 124 | 125 | 126 | 127 | 128 | 129 | 130 | 131 |
| 61 | 360 | 361 | 362 | 363 | 364 | 365 | 366 | 367 | 368 | 369 | 370 | 371 |
| 62 | 600 | 601 | 602 | 603 | 604 | 605 | 606 | 607 | 608 | 609 | 610 | 611 |
| 63 | 840 | 841 | 842 | 843 | 844 | 845 | 846 | 847 | 848 | 849 | 850 | 851 |
| 64 | 1080 | 1081 | 1082 | 1083 | 1084 | 1085 | 1086 | 1087 | 1088 | 1089 | 1090 | 1091 |
| 65 | 168 | 169 | 170 | 171 | 172 | 173 | 174 | 175 | 176 | 177 | 178 | 179 |
| 66 | 408 | 409 | 410 | 411 | 412 | 413 | 414 | 415 | 416 | 417 | 418 | 419 |
| 67 | 648 | 649 | 650 | 651 | 652 | 653 | 654 | 655 | 656 | 657 | 658 | 659 |
| 68 | 888 | 889 | 890 | 891 | 892 | 893 | 894 | 895 | 896 | 897 | 898 | 899 |
| 69 | 1128 | 1129 | 1130 | 1131 | 1132 | 1133 | 1134 | 1135 | 1136 | 1137 | 1138 | 1139 |
| 70 | 216 | 217 | 218 | 219 | 220 | 221 | 222 | 223 | 224 | 225 | 226 | 227 |
| 71 | 456 | 457 | 458 | 459 | 460 | 461 | 462 | 463 | 464 | 465 | 466 | 467 |
| 72 | 696 | 697 | 698 | 699 | 700 | 701 | 702 | 703 | 704 | 705 | 706 | 707 |
| 73 | 936 | 937 | 938 | 939 | 940 | 941 | 942 | 943 | 944 | 945 | 946 | 947 |
| 74 | 1176 | 1177 | 1178 | 1179 | 1180 | 1181 | 1182 | 1183 | 1184 | 1185 | 1186 | 1187 |
| 75 | 36 | 37 | 38 | 39 | 40 | 41 | 42 | 43 | 44 | 45 | 46 | 47 | ← 1608 |

| SIMDIndx OffsetAddr | W0 | W1 | W2 | W3 | W4 | W5 | W6 | W7 | W8 | W9 | W10 | W11 |
|---|---|---|---|---|---|---|---|---|---|---|---|---|
| 76 | 276 | 277 | 278 | 279 | 280 | 281 | 282 | 283 | 284 | 285 | 286 | 287 |
| 77 | 516 | 517 | 518 | 519 | 520 | 521 | 522 | 523 | 524 | 525 | 526 | 527 |
| 78 | 756 | 757 | 758 | 759 | 760 | 761 | 762 | 763 | 764 | 765 | 766 | 767 |
| 79 | 996 | 997 | 998 | 999 | 1000 | 1001 | 1002 | 1003 | 1004 | 1005 | 1006 | 1007 |
| 80 | 84 | 85 | 86 | 87 | 88 | 89 | 90 | 91 | 92 | 93 | 94 | 95 |
| 81 | 324 | 325 | 326 | 327 | 328 | 329 | 330 | 331 | 332 | 333 | 334 | 335 |
| 82 | 564 | 565 | 566 | 567 | 568 | 569 | 570 | 571 | 572 | 573 | 574 | 575 |
| 83 | 804 | 805 | 806 | 807 | 808 | 809 | 810 | 811 | 812 | 813 | 814 | 815 |
| 84 | 1044 | 1045 | 1046 | 1047 | 1048 | 1049 | 1050 | 1051 | 1052 | 1053 | 1054 | 1055 |
| 85 | 132 | 133 | 134 | 135 | 136 | 137 | 138 | 139 | 140 | 141 | 142 | 143 |
| 86 | 372 | 373 | 374 | 375 | 376 | 377 | 378 | 379 | 380 | 381 | 382 | 383 |
| 87 | 612 | 613 | 614 | 615 | 616 | 617 | 618 | 619 | 620 | 621 | 622 | 623 |
| 88 | 852 | 853 | 854 | 855 | 856 | 857 | 858 | 859 | 860 | 861 | 862 | 863 |
| 89 | 1092 | 1093 | 1094 | 1095 | 1096 | 1097 | 1098 | 1099 | 1100 | 1101 | 1102 | 1103 |
| 90 | 180 | 181 | 182 | 183 | 184 | 185 | 186 | 187 | 188 | 189 | 190 | 191 |
| 91 | 420 | 421 | 422 | 423 | 424 | 425 | 426 | 427 | 428 | 429 | 430 | 431 |
| 92 | 660 | 661 | 662 | 663 | 664 | 665 | 666 | 667 | 668 | 669 | 670 | 671 |
| 93 | 900 | 901 | 902 | 903 | 904 | 905 | 906 | 907 | 908 | 909 | 910 | 911 |
| 94 | 1140 | 1141 | 1142 | 1143 | 1144 | 1145 | 1146 | 1147 | 1148 | 1149 | 1150 | 1151 |
| 95 | 228 | 229 | 230 | 231 | 232 | 233 | 234 | 235 | 236 | 237 | 238 | 239 |
| 96 | 468 | 469 | 470 | 471 | 472 | 473 | 474 | 475 | 476 | 477 | 478 | 479 |
| 97 | 708 | 709 | 710 | 711 | 712 | 713 | 714 | 715 | 716 | 717 | 718 | 719 |
| 98 | 948 | 949 | 950 | 951 | 952 | 953 | 954 | 955 | 956 | 957 | 958 | 959 |
| 99 | 1188 | 1189 | 1190 | 1191 | 1192 | 1193 | 1194 | 1195 | 1196 | 1197 | 1198 | 1199 |
| 100 | 0 | 0 | 0 | 0 | 0 | 0 | 0 | 0 | 0 | 0 | 0 | 0 |
| 101 | 0 | 0 | 0 | 0 | 0 | 0 | 0 | 0 | 0 | 0 | 0 | 0 |
| 102 | 0 | 0 | 0 | 0 | 0 | 0 | 0 | 0 | 0 | 0 | 0 | 0 |
| 103 | 0 | 0 | 0 | 0 | 0 | 0 | 0 | 0 | 0 | 0 | 0 | 0 |
| 104 | 0 | 0 | 0 | 0 | 0 | 0 | 0 | 0 | 0 | 0 | 0 | 0 |
| ⋮ | | | | | | | | | | | | |
| 126 | 0 | 0 | 0 | 0 | 0 | 0 | 0 | 0 | 0 | 0 | 0 | 0 |
| 127 | 0 | 0 | 0 | 0 | 0 | 0 | 0 | 0 | 0 | 0 | 0 | 0 |

FIG. 16C

Section 1

| SIMDIndx OffsetAddr | W0 | W1 | W2 | W3 | W4 | W5 | W6 | W7 | W8 | W9 | W10 | W11 |
|---|---|---|---|---|---|---|---|---|---|---|---|---|
| 0 | 0 | 1 | 2 | 3 | 4 | 5 | 6 | 7 | 8 | 9 | 10 | 11 |
| 1 | 216 | 217 | 218 | 219 | 220 | 221 | 222 | 223 | 224 | 225 | 226 | 227 |
| 2 | 432 | 433 | 434 | 435 | 436 | 437 | 438 | 439 | 440 | 441 | 442 | 443 |
| 3 | 648 | 649 | 650 | 651 | 652 | 653 | 654 | 655 | 656 | 657 | 658 | 659 |
| 4 | 864 | 865 | 866 | 867 | 868 | 869 | 870 | 871 | 872 | 873 | 874 | 875 |
| 5 | 72 | 73 | 74 | 75 | 76 | 77 | 78 | 79 | 80 | 81 | 82 | 83 |
| 6 | 288 | 289 | 290 | 291 | 292 | 293 | 294 | 295 | 296 | 297 | 298 | 299 |
| 7 | 504 | 505 | 506 | 507 | 508 | 509 | 510 | 511 | 512 | 513 | 514 | 515 |
| 8 | 720 | 721 | 722 | 723 | 724 | 725 | 726 | 727 | 728 | 729 | 730 | 731 |
| 9 | 936 | 937 | 938 | 939 | 940 | 941 | 942 | 943 | 944 | 945 | 946 | 947 |
| 10 | 144 | 145 | 146 | 147 | 148 | 149 | 150 | 151 | 152 | 153 | 154 | 155 |
| 11 | 360 | 361 | 362 | 363 | 364 | 365 | 366 | 367 | 368 | 369 | 370 | 371 |
| 12 | 576 | 577 | 578 | 579 | 580 | 581 | 582 | 583 | 584 | 585 | 586 | 587 |
| 13 | 792 | 793 | 794 | 795 | 796 | 797 | 798 | 799 | 800 | 801 | 802 | 803 |
| 14 | 1008 | 1009 | 1010 | 1011 | 1012 | 1013 | 1014 | 1015 | 1016 | 1017 | 1018 | 1019 |
| 15 | 24 | 25 | 26 | 27 | 28 | 29 | 30 | 31 | 32 | 33 | 34 | 35 |
| 16 | 240 | 241 | 242 | 243 | 244 | 245 | 246 | 247 | 248 | 249 | 250 | 251 |
| 17 | 456 | 457 | 458 | 459 | 460 | 461 | 462 | 463 | 464 | 465 | 466 | 467 |
| 18 | 672 | 673 | 674 | 675 | 676 | 677 | 678 | 679 | 680 | 681 | 682 | 683 |
| 19 | 888 | 889 | 890 | 891 | 892 | 893 | 894 | 895 | 896 | 897 | 898 | 899 |
| 20 | 96 | 97 | 98 | 99 | 100 | 101 | 102 | 103 | 104 | 105 | 106 | 107 |
| 21 | 312 | 313 | 314 | 315 | 316 | 317 | 318 | 319 | 320 | 321 | 322 | 323 |
| 22 | 528 | 529 | 530 | 531 | 532 | 533 | 534 | 535 | 536 | 537 | 538 | 539 |
| 23 | 744 | 745 | 746 | 747 | 748 | 749 | 750 | 751 | 752 | 753 | 754 | 755 |
| 24 | 960 | 961 | 962 | 963 | 964 | 965 | 966 | 967 | 968 | 969 | 970 | 971 |
| 25 | 168 | 169 | 170 | 171 | 172 | 173 | 174 | 175 | 176 | 177 | 178 | 179 |
| 26 | 384 | 385 | 386 | 387 | 388 | 389 | 390 | 391 | 392 | 393 | 394 | 395 |
| 27 | 600 | 601 | 602 | 603 | 604 | 605 | 606 | 607 | 608 | 609 | 610 | 611 |
| 28 | 816 | 817 | 818 | 819 | 820 | 821 | 822 | 823 | 824 | 825 | 826 | 827 |
| 29 | 1032 | 1033 | 1034 | 1035 | 1036 | 1037 | 1038 | 1039 | 1040 | 1041 | 1042 | 1043 |
| 30 | 48 | 49 | 50 | 51 | 52 | 53 | 54 | 55 | 56 | 57 | 58 | 59 |
| 31 | 264 | 265 | 266 | 267 | 268 | 269 | 270 | 271 | 272 | 273 | 274 | 275 |
| 32 | 480 | 481 | 482 | 483 | 484 | 485 | 486 | 487 | 488 | 489 | 490 | 491 |

FIG. 17A

Section 1

| SIMDIndx OffsetAddr | W0 | W1 | W2 | W3 | W4 | W5 | W6 | W7 | W8 | W9 | W10 | W11 |
|---|---|---|---|---|---|---|---|---|---|---|---|---|
| 33 | 696 | 697 | 698 | 699 | 700 | 701 | 702 | 703 | 704 | 705 | 706 | 707 |
| 34 | 912 | 913 | 914 | 915 | 916 | 917 | 918 | 919 | 920 | 921 | 922 | 923 |
| 35 | 120 | 121 | 122 | 123 | 124 | 125 | 126 | 127 | 128 | 129 | 130 | 131 |
| 36 | 336 | 337 | 338 | 339 | 340 | 341 | 342 | 343 | 344 | 345 | 346 | 347 |
| 37 | 552 | 553 | 554 | 555 | 556 | 557 | 558 | 559 | 560 | 561 | 562 | 563 |
| 38 | 768 | 769 | 770 | 771 | 772 | 773 | 774 | 775 | 776 | 777 | 778 | 779 |
| 39 | 984 | 985 | 986 | 987 | 988 | 989 | 990 | 991 | 992 | 993 | 994 | 995 |
| 40 | 192 | 193 | 194 | 195 | 196 | 197 | 198 | 199 | 200 | 201 | 202 | 203 |
| 41 | 408 | 409 | 410 | 411 | 412 | 413 | 414 | 415 | 416 | 417 | 418 | 419 |
| 42 | 624 | 625 | 626 | 627 | 628 | 629 | 630 | 631 | 632 | 633 | 634 | 635 |
| 43 | 840 | 841 | 842 | 843 | 844 | 845 | 846 | 847 | 848 | 849 | 850 | 851 |
| 44 | 1056 | 1057 | 1058 | 1059 | 1060 | 1061 | 1062 | 1063 | 1064 | 1065 | 1066 | 1067 |
| 45 | 0 | 0 | 0 | 0 | 0 | 0 | 0 | 0 | 0 | 0 | 0 | 0 |
| 46 | 0 | 0 | 0 | 0 | 0 | 0 | 0 | 0 | 0 | 0 | 0 | 0 |
| 47 | 0 | 0 | 0 | 0 | 0 | 0 | 0 | 0 | 0 | 0 | 0 | 0 |
| 48 | 0 | 0 | 0 | 0 | 0 | 0 | 0 | 0 | 0 | 0 | 0 | 0 |
| 49 | 0 | 0 | 0 | 0 | 0 | 0 | 0 | 0 | 0 | 0 | 0 | 0 |
| 50 | 0 | 0 | 0 | 0 | 0 | 0 | 0 | 0 | 0 | 0 | 0 | 0 |
| 51 | 0 | 0 | 0 | 0 | 0 | 0 | 0 | 0 | 0 | 0 | 0 | 0 |
| 52 | 0 | 0 | 0 | 0 | 0 | 0 | 0 | 0 | 0 | 0 | 0 | 0 |
| 53 | 0 | 0 | 0 | 0 | 0 | 0 | 0 | 0 | 0 | 0 | 0 | 0 |
| 54 | 0 | 0 | 0 | 0 | 0 | 0 | 0 | 0 | 0 | 0 | 0 | 0 |
| 55 | 0 | 0 | 0 | 0 | 0 | 0 | 0 | 0 | 0 | 0 | 0 | 0 |
| 56 | 0 | 0 | 0 | 0 | 0 | 0 | 0 | 0 | 0 | 0 | 0 | 0 |
| 57 | 0 | 0 | 0 | 0 | 0 | 0 | 0 | 0 | 0 | 0 | 0 | 0 |
| 58 | 0 | 0 | 0 | 0 | 0 | 0 | 0 | 0 | 0 | 0 | 0 | 0 |
| 59 | 0 | 0 | 0 | 0 | 0 | 0 | 0 | 0 | 0 | 0 | 0 | 0 |
| 60 | 0 | 0 | 0 | 0 | 0 | 0 | 0 | 0 | 0 | 0 | 0 | 0 |
| 61 | 0 | 0 | 0 | 0 | 0 | 0 | 0 | 0 | 0 | 0 | 0 | 0 |
| 62 | 0 | 0 | 0 | 0 | 0 | 0 | 0 | 0 | 0 | 0 | 0 | 0 |
| 63 | 0 | 0 | 0 | 0 | 0 | 0 | 0 | 0 | 0 | 0 | 0 | 0 |

FIG. 17B

Section 2

| SIMDIndx OffsetAddr\ | W0 | W1 | W2 | W3 | W4 | W5 | W6 | W7 | W8 | W9 | W10 | W11 |
|---|---|---|---|---|---|---|---|---|---|---|---|---|
| 64 | 12 | 13 | 14 | 15 | 16 | 17 | 18 | 19 | 20 | 21 | 22 | 23 |
| 65 | 228 | 229 | 230 | 231 | 232 | 233 | 234 | 235 | 236 | 237 | 238 | 239 |
| 66 | 444 | 445 | 446 | 447 | 448 | 449 | 450 | 451 | 452 | 453 | 454 | 455 |
| 67 | 660 | 661 | 662 | 663 | 664 | 665 | 666 | 667 | 668 | 669 | 670 | 671 |
| 68 | 876 | 877 | 878 | 879 | 880 | 881 | 882 | 883 | 884 | 885 | 886 | 887 |
| 69 | 84 | 85 | 86 | 87 | 88 | 89 | 90 | 91 | 92 | 93 | 94 | 95 |
| 70 | 300 | 301 | 302 | 303 | 304 | 305 | 306 | 307 | 308 | 309 | 310 | 311 |
| 71 | 516 | 517 | 518 | 519 | 520 | 521 | 522 | 523 | 524 | 525 | 526 | 527 |
| 72 | 732 | 733 | 734 | 735 | 736 | 737 | 738 | 739 | 740 | 741 | 742 | 743 |
| 73 | 948 | 949 | 950 | 951 | 952 | 953 | 954 | 955 | 956 | 957 | 958 | 959 |
| 74 | 156 | 157 | 158 | 159 | 160 | 161 | 162 | 163 | 164 | 165 | 166 | 167 |
| 75 | 372 | 373 | 374 | 375 | 376 | 377 | 378 | 379 | 380 | 381 | 382 | 383 |
| 76 | 588 | 589 | 590 | 591 | 592 | 593 | 594 | 595 | 596 | 597 | 598 | 599 |
| 77 | 804 | 805 | 806 | 807 | 808 | 809 | 810 | 811 | 812 | 813 | 814 | 815 |
| 78 | 1020 | 1021 | 1022 | 1023 | 1024 | 1025 | 1026 | 1027 | 1028 | 1029 | 1030 | 1031 |
| 79 | 36 | 37 | 38 | 39 | 40 | 41 | 42 | 43 | 44 | 45 | 46 | 47 |
| 80 | 252 | 253 | 254 | 255 | 256 | 257 | 258 | 259 | 260 | 261 | 262 | 263 |
| 81 | 468 | 469 | 470 | 471 | 472 | 473 | 474 | 475 | 476 | 477 | 478 | 479 |
| 82 | 684 | 685 | 686 | 687 | 688 | 689 | 690 | 691 | 692 | 693 | 694 | 695 |
| 83 | 900 | 901 | 902 | 903 | 904 | 905 | 906 | 907 | 908 | 909 | 910 | 911 |
| 84 | 108 | 109 | 110 | 111 | 112 | 113 | 114 | 115 | 116 | 117 | 118 | 119 |
| 85 | 324 | 325 | 326 | 327 | 328 | 329 | 330 | 331 | 332 | 333 | 334 | 335 |
| 86 | 540 | 541 | 542 | 543 | 544 | 545 | 546 | 547 | 548 | 549 | 550 | 551 |
| 87 | 756 | 757 | 758 | 759 | 760 | 761 | 762 | 763 | 764 | 765 | 766 | 767 |
| 88 | 972 | 973 | 974 | 975 | 976 | 977 | 978 | 979 | 980 | 981 | 982 | 983 |
| 89 | 180 | 181 | 182 | 183 | 184 | 185 | 186 | 187 | 188 | 189 | 190 | 191 |
| 90 | 396 | 397 | 398 | 399 | 400 | 401 | 402 | 403 | 404 | 405 | 406 | 407 |
| 91 | 612 | 613 | 614 | 615 | 616 | 617 | 618 | 619 | 620 | 621 | 622 | 623 |
| 92 | 828 | 829 | 830 | 831 | 832 | 833 | 834 | 835 | 836 | 837 | 838 | 839 |
| 93 | 1044 | 1045 | 1046 | 1047 | 1048 | 1049 | 1050 | 1051 | 1052 | 1053 | 1054 | 1055 |
| 94 | 60 | 61 | 62 | 63 | 64 | 65 | 66 | 67 | 68 | 69 | 70 | 71 |
| 95 | 276 | 277 | 278 | 279 | 280 | 281 | 282 | 283 | 284 | 285 | 286 | 287 |
| 96 | 492 | 493 | 494 | 495 | 496 | 497 | 498 | 499 | 500 | 501 | 502 | 503 |

FIG. 17C

Section 2

| SIMDIndx OffsetAddr | W0 | W1 | W2 | W3 | W4 | W5 | W6 | W7 | W8 | W9 | W10 | W11 |
|---|---|---|---|---|---|---|---|---|---|---|---|---|
| 97 | 708 | 709 | 710 | 711 | 712 | 713 | 714 | 715 | 716 | 717 | 718 | 719 |
| 98 | 924 | 925 | 926 | 927 | 928 | 929 | 930 | 931 | 932 | 933 | 934 | 935 |
| 99 | 132 | 133 | 134 | 135 | 136 | 137 | 138 | 139 | 140 | 141 | 142 | 143 |
| 100 | 348 | 349 | 350 | 351 | 352 | 353 | 354 | 355 | 356 | 357 | 358 | 359 |
| 101 | 564 | 565 | 566 | 567 | 568 | 569 | 570 | 571 | 572 | 573 | 574 | 575 |
| 102 | 780 | 781 | 782 | 783 | 784 | 785 | 786 | 787 | 788 | 789 | 790 | 791 |
| 103 | 996 | 997 | 998 | 999 | 1000 | 1001 | 1002 | 1003 | 1004 | 1005 | 1006 | 1007 |
| 104 | 204 | 205 | 206 | 207 | 208 | 209 | 210 | 211 | 212 | 213 | 214 | 215 |
| 105 | 420 | 421 | 422 | 423 | 424 | 425 | 426 | 427 | 428 | 429 | 430 | 431 |
| 106 | 636 | 637 | 638 | 639 | 640 | 641 | 642 | 643 | 644 | 645 | 646 | 647 |
| 107 | 852 | 853 | 854 | 855 | 856 | 857 | 858 | 859 | 860 | 861 | 862 | 863 |
| 108 | 1068 | 1069 | 1070 | 1071 | 1072 | 1073 | 1074 | 1075 | 1076 | 1077 | 1078 | 1079 |
| 109 | 0 | 0 | 0 | 0 | 0 | 0 | 0 | 0 | 0 | 0 | 0 | 0 |
| 110 | 0 | 0 | 0 | 0 | 0 | 0 | 0 | 0 | 0 | 0 | 0 | 0 |
| 111 | 0 | 0 | 0 | 0 | 0 | 0 | 0 | 0 | 0 | 0 | 0 | 0 |
| 112 | 0 | 0 | 0 | 0 | 0 | 0 | 0 | 0 | 0 | 0 | 0 | 0 |
| 113 | 0 | 0 | 0 | 0 | 0 | 0 | 0 | 0 | 0 | 0 | 0 | 0 |
| 114 | 0 | 0 | 0 | 0 | 0 | 0 | 0 | 0 | 0 | 0 | 0 | 0 |
| 115 | 0 | 0 | 0 | 0 | 0 | 0 | 0 | 0 | 0 | 0 | 0 | 0 |
| 116 | 0 | 0 | 0 | 0 | 0 | 0 | 0 | 0 | 0 | 0 | 0 | 0 |
| 117 | 0 | 0 | 0 | 0 | 0 | 0 | 0 | 0 | 0 | 0 | 0 | 0 |
| 118 | 0 | 0 | 0 | 0 | 0 | 0 | 0 | 0 | 0 | 0 | 0 | 0 |
| 119 | 0 | 0 | 0 | 0 | 0 | 0 | 0 | 0 | 0 | 0 | 0 | 0 |
| 120 | 0 | 0 | 0 | 0 | 0 | 0 | 0 | 0 | 0 | 0 | 0 | 0 |
| 121 | 0 | 0 | 0 | 0 | 0 | 0 | 0 | 0 | 0 | 0 | 0 | 0 |
| 122 | 0 | 0 | 0 | 0 | 0 | 0 | 0 | 0 | 0 | 0 | 0 | 0 |
| 123 | 0 | 0 | 0 | 0 | 0 | 0 | 0 | 0 | 0 | 0 | 0 | 0 |
| 124 | 0 | 0 | 0 | 0 | 0 | 0 | 0 | 0 | 0 | 0 | 0 | 0 |
| 125 | 0 | 0 | 0 | 0 | 0 | 0 | 0 | 0 | 0 | 0 | 0 | 0 |
| 126 | 0 | 0 | 0 | 0 | 0 | 0 | 0 | 0 | 0 | 0 | 0 | 0 |
| 127 | 0 | 0 | 0 | 0 | 0 | 0 | 0 | 0 | 0 | 0 | 0 | 0 |

METHOD AND APPARATUS FOR A VECTOR MEMORY SUBSYSTEM FOR USE WITH A PROGRAMMABLE MIXED-RADIX DFT/IDFT PROCESSOR

PRIORITY

This patent application is a continuation patent application of a co-pending U.S. patent application having a U.S. patent application Ser. No. 15/292,015, filed on Oct. 12, 2016 in the name of the same inventor and entitled "Methods and Apparatus for a Vector Memory Subsystem for Use with a Programmable Mixed-Radix DFT/IDFT Processor," which has been issued with U.S. Pat. No. 10,311,018, which is a CIP U.S. Patent Application having an application Ser. No. 15/272,332 filed on Sep. 21, 2016, entitled "METHOD AND APPARATUS FOR PROVIDING A PROGRAMMABLE MIXED-RADIX DFT/IDFT PROCESSOR USING VECTOR ENGINES," which has been issued with U.S. Pat. No. 10,210,135, which further claims the benefit of priority based upon U.S. Provisional Patent Application having an Application No. 62/279,345, filed on Jan. 15, 2016, and entitled "METHOD AND APPARATUS FOR PROVIDING PROGRAMMABLE MIXED-RADIX DFT/IDFT PROCESSOR USING VECTOR MEMORY SUBSYSTEM," and U.S. Provisional Patent Application having an Application No. 62/274,686, filed on Jan. 4, 2016, and entitled "METHOD AND APPARATUS FOR DYNAMICALLY GENERATING MIXED-RADIX TWIDDLE COEFFICIENT VECTORS," and U.S. Provisional Patent Application having Application No. 62/274,062, filed on Dec. 31, 2015, and entitled "METHOD AND APPARATUS FOR PROVIDING PROGRAMMABLE MIXED RADIX DFT PROCESSOR USING VECTOR ENGINES," all of which are hereby incorporated herein by reference in their entirety.

FIELD

The exemplary embodiments of the present invention relate to the design and operation of telecommunications networks. More specifically, the exemplary embodiments of the present invention relate to receiving and processing data streams in a wireless communication network.

BACKGROUND

There is a rapidly growing trend for mobile and remote data access over a high-speed communication network such as 3G or 4G cellular networks. However, accurately delivering and deciphering data streams over these networks has become increasingly challenging and difficult. High-speed communication networks which are capable of delivering information include, but are not limited to, wireless networks, cellular networks, wireless personal area networks ("WPAN"), wireless local area networks ("WLAN"), wireless metropolitan area networks ("MAN"), or the like. While WPAN can be Bluetooth or ZigBee, WLAN may be a Wi-Fi network in accordance with IEEE 802.11 WLAN standards.

To communicate high speed data over a communication network, such as a long term evolution (LTE) communication network, the network needs to support many configurations and process data utilizing different FFT sizes. A variety of architectures have been proposed for pipelined FFT processing that are capable of processing an uninterrupted stream of input data samples while producing a stream of output data samples at a matching rate. However, these architectures typically utilize multiple stages of FFT radix processors organized in a pipelined mode. The data is streamed into a first stage to complete a first radix operation and then the data is stream to subsequent stages for subsequent radix operations.

Thus, conventional pipelined architectures utilize multiple physical radix processors laid out in series to create the pipeline for streaming in/out data. The number of stages utilized is determined by the largest FFT size to be supported. However, this design becomes more complex when processing a variety of FFT sizes that require mixed-radix (2, 3, 4, 5, and 6) processing typically used in cellular (e.g., LTE) transceivers. As a result, the drawbacks of conventional systems are not only the amount of hardware resources utilized, but also the difficulty to configure such a system with the many different FFT sizes and mixed-radix factorization schemes utilized in an LTE transceiver.

Therefore, it is desirable to have a pipelined FFT architecture that is faster and consumes fewer resources than conventional systems. The architecture should have a higher performance to power/area ratio than the conventional architectures, and achieve much higher scalability and programmability for all possible mix-radix operations.

SUMMARY

The following summary illustrates simplified versions of one or more aspects of present invention. The purpose of this summary is to present some concepts in a simplified description as more detailed descriptions are provided below.

A programmable vector processor ("PVP") capable of calculating discrete Fourier transform ("DFT") values is disclosed. The PVP includes a ping-pong vector memory bank, a twiddle factor generator, and a programmable vector mixed radix engine that communicate data through a vector pipeline. The ping-pong vector memory bank is able to store input data and feedback data with optimal storage contention. The twiddle factor generator generates various twiddle values for DFT calculations. The programmable vector mixed radix engine is configured to provide one of multiple DFT radix results. For example, the programmable vector mixed radix engine can be programmed to perform radix3, radix4, radix 5 and radix6 DFT calculations. In one embodiment, the PVP also includes a vector memory address generator for producing storage addresses, and a vector dynamic scaling factor calculator capable of determining scaling values.

In an exemplary embodiment, an apparatus includes a vector memory bank and a vector data path pipeline coupled to the vector memory bank. The apparatus also includes a configurable mixed radix engine coupled to the vector data path pipeline. The configurable mixed radix engine is configurable to perform a selected radix computation selected from a plurality of radix computations. The configurable mixed radix engine performs the selected radix computation on data received from the vector memory bank through the vector pipeline to generate a radix result. The apparatus also includes a controller that controls how many radix computation iterations will be performed to compute an N-point DFT based on a radix factorization.

In an exemplary embodiment, a method for performing an N-point DFT is disclosed. The method includes determining a radix factorization to compute the N-point DFT, the radix factorization determines one or more stages of radix calculations to be performed. The method also includes performing an iteration for each radix calculation. Each iteration includes reading data from a vector memory bank into a vector data path pipeline, configuring a configurable mixed radix engine to perform a selected radix calculation, performing the selected radix calculation on the data in the vector data path pipeline, storing a radix result of the selected radix calculation back into the vector memory bank, if the current iteration is not the last iteration, and outputting the radix result of the selected radix calculation as the N-point DFT result, if the current iteration is the last iteration.

In an exemplary embodiment, an apparatus includes a vector memory bank and a vector memory system (VMS) that generates input memory addresses that are used to store input data into the vector memory bank. The VMS also generates output memory addresses that are used to unload vector data from the memory banks. The input memory addresses are used to shuffle the input data in the memory bank based on a radix factorization associated with an N-point DFT, and the output memory addresses are used to unload the vector data from the memory bank to compute radix factors of the radix factorization.

In an exemplary embodiment, a method includes generating input memory addresses that are used to store input data into a vector memory bank. The input memory addresses are used to shuffle the data in the memory bank based on a radix factorization associated with an N-point DFT. The method also includes generating output memory addresses that are used to unload vector data from the vector memory bank to compute radix factors of the radix factorization.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

FIG. 3 is a table showing DFT/IDFT sizes with respect to index and resource block ("RB") allocations in accordance with exemplary embodiments of the present invention;

FIGS. 16A-C illustrate an exemplary embodiment of a memory input data pattern for a 1200-point DFT having one section based on a radix factorization where the last two stage of the radix factorization include {x, x, x, 3, 4};

FIGS. 17A-D illustrate an exemplary embodiment of a memory input data pattern for a 1080-point DFT having two sections based on a radix factorization where the last two stage of the radix factorization include {x, x, x, 6, 4};

DETAILED DESCRIPTION

Figure 1:
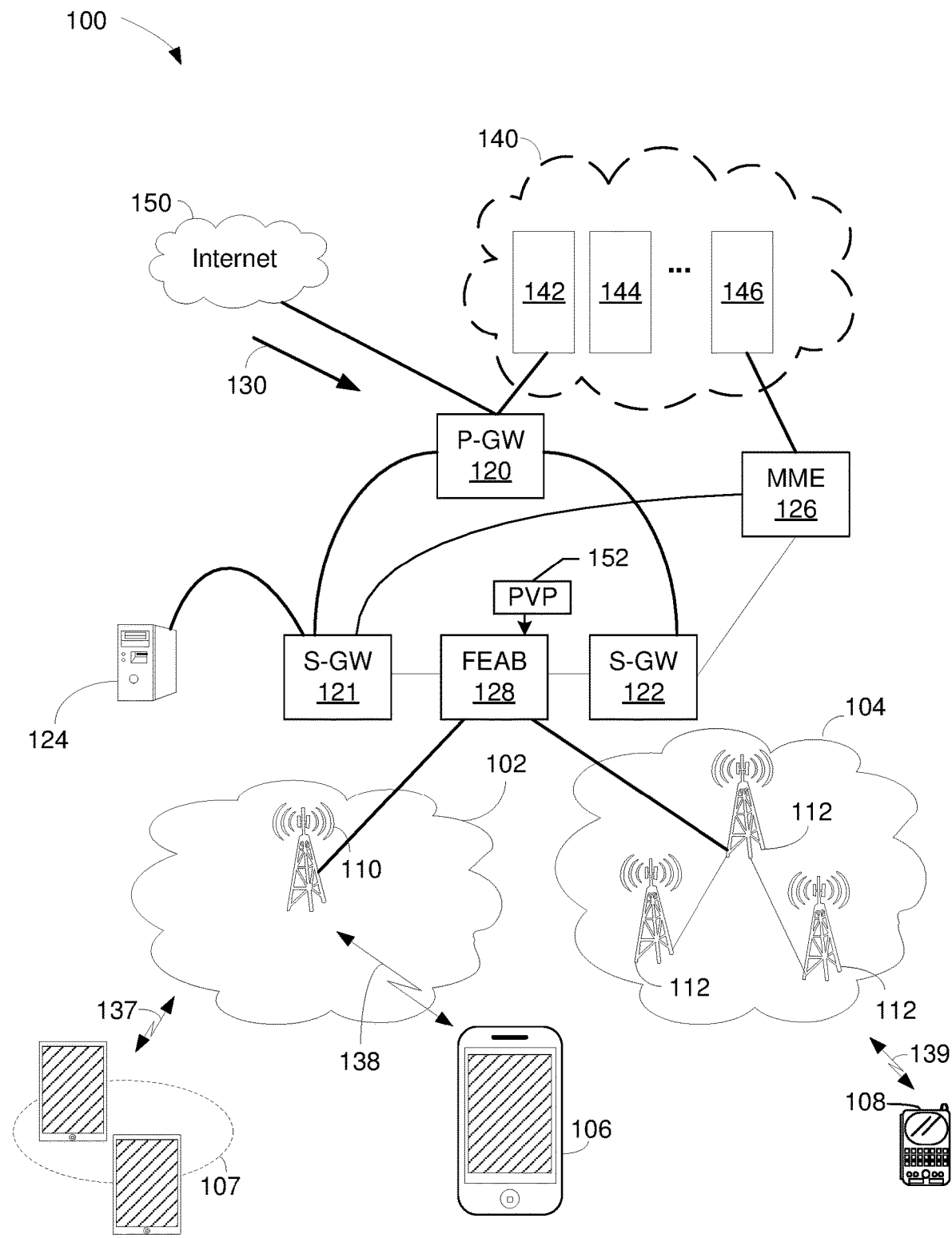
FIG. 1 is a block diagram illustrating a computing network configured to transmit data streams using a programmable vector processor in accordance with exemplary embodiments of the present invention.

Aspects of the present invention are described herein the context of a methods and/or apparatus for processing control information relating to wireless data.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, sub-systems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

FIG. 1 is a diagram illustrating a computing network 100 configured to transmit data streams using a programmable vector processor in accordance with exemplary embodiments of the present invention. The computer network 100 includes packet data network gateway ("P-GW") 120, two serving gateways ("S-GWs") 121-122, two base stations (or cell sites) 102-104, server 124, and Internet 150. P-GW 120 includes various components 140 such as billing module 142, subscribing module 144, tracking module 146, and the like to facilitate routing activities between sources and destinations. It should be noted that the underlying concepts of the exemplary embodiments of the present invention would not change if one or more blocks (or devices) were added or removed from computer network 100.

The configuration of the computer network 100 may be referred to as a third generation ("3G"), 4G, LTE, 5G, or combination of 3G and 4G cellular network configuration. MME 126, in one aspect, is coupled to base stations (or cell site) and S-GWs capable of facilitating data transfer between 3G and LTE (long term evolution) or between 2G and LTE. MME 126 performs various controlling/managing functions, network securities, and resource allocations.

S-GW 121 or 122, in one example, coupled to P-GW 120, MME 126, and base stations 102 or 104, is capable of routing data packets from base station 102, or eNodeB, to P-GW 120 and/or MME 126. A function of S-GW 121 or 122 is to perform an anchoring function for mobility between 3G and 4G equipment. S-GW 122 is also able to perform various network management functions, such as terminating paths, paging idle UEs, storing data, routing information, generating replica, and the like.

P-GW 120, coupled to S-GWs 121-122 and Internet 150, is able to provide network communication between user equipment ("UE") and IP based networks such as Internet 150. P-GW 120 is used for connectivity, packet filtering, inspection, data usage, billing, or PCRF (policy and charging rules function) enforcement, et cetera. P-GW 120 also provides an anchoring function for mobility between 3G and 4G (or LTE) packet core networks.

Sectors or blocks 102-104 are coupled to a base station or FEAB 128 which may also be known as a cell site, node B, or eNodeB. Sectors 102-104 include one or more radio towers 110 or 112. Radio tower 110 or 112 is further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Base station 102 facilitates network communication between mobile devices such as UEs 106-107 with S-GW 121 via radio towers 110. It should be noted that base station or cell site can include additional radio towers as well as other land switching circuitry.

Server 124 is coupled to P-GW 120 and base stations 102-104 via S-GW 121 or 122. In one embodiment, server 124 which contains a soft decoding scheme 128 is able to distribute and/or manage soft decoding and/or hard decoding based on predefined user selections. In one exemplary instance, upon detecting a downstream push data 130 addressing to mobile device 106 which is located in a busy traffic area or noisy location, base station 102 can elect to decode the downstream using the soft decoding scheme distributed by server 124. One advantage of using the soft decoding scheme is that it provides more accurate data decoding, whereby overall data integrity may be enhanced.

When receiving bit-streams via one or more wireless or cellular channels, a decoder can optionally receive or decipher bit-streams with hard decision or soft decision. A hard decision is either 1 or 0 which means any analog value greater than 0.5 is a logic value one (1) and any analog value less than 0.5 is a logic value zero (0). Alternatively, a soft decision or soft information can provide a range of value from 0, 0.2, 0.4, 0.5, 0.6, 0.8, 0.9, and the like. For example, soft information of 0.8 would be deciphered as a highly likelihood one (1) whereas soft information of 0.4 would be interpreted as a weak zero (0) and maybe one (1).

A base station, in one aspect, includes one or more FEABs 128. For example, FEAB 128 can be a transceiver of a base station or eNodeB. In one aspect, mobile devices such tables or iPad® 107 uses a first type of RF signals to communicate with radio tower 110 at sector 102 and portable device 108 uses a second type of RF signals to communicate with radio tower 112 at sector 104. In an exemplary embodiment, the FEAB 128 comprises an exemplary embodiment of a PVP 152. After receiving RF samples, FEAB 128 is able to process samples using the PVP 152 in accordance with the exemplary embodiments. An advantage of using the PVP 152 is to improve throughput as well as resource conservation.

Figure 2:
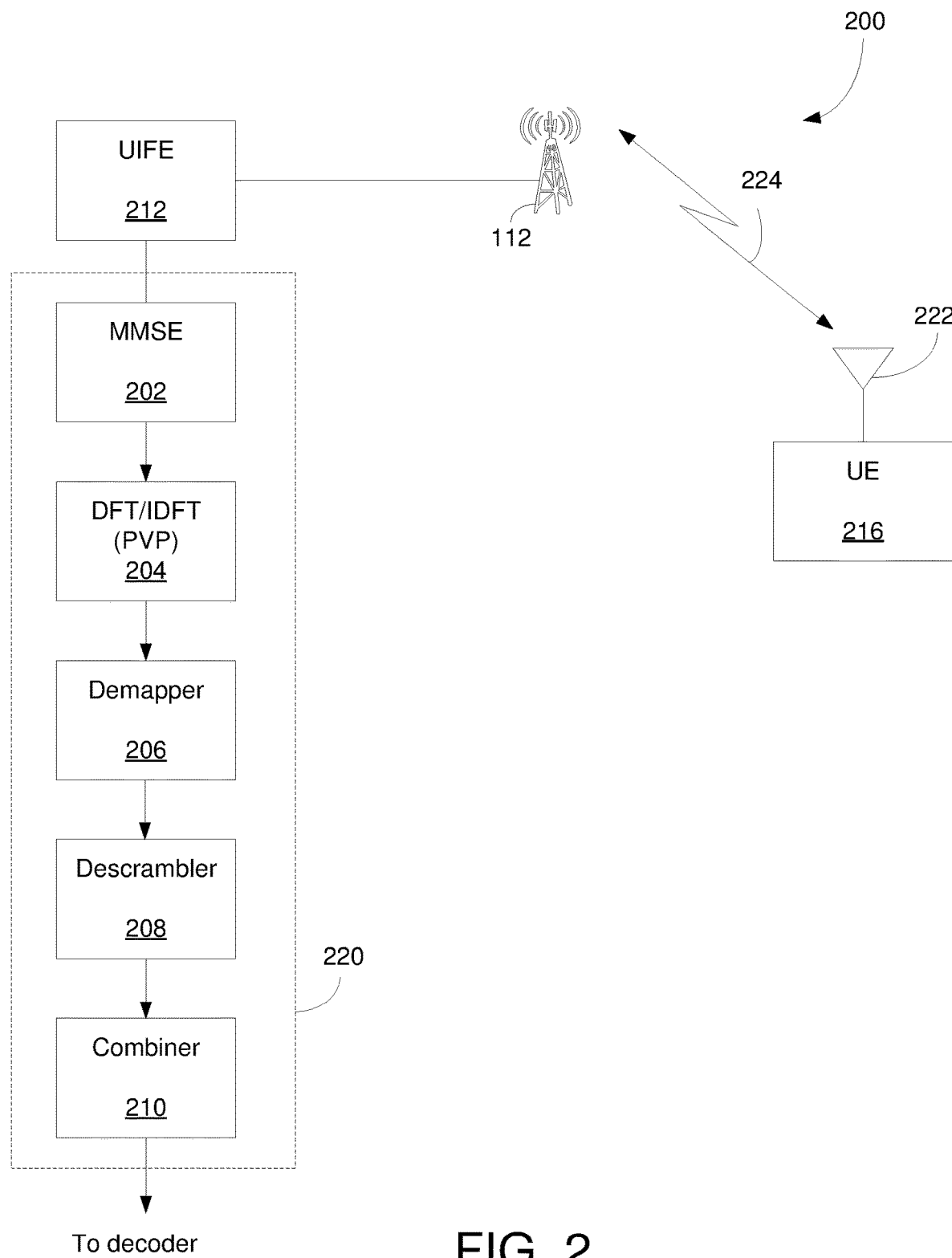
FIG. 2 is a block diagram illustrating logic flows of data streams traveling through a transceiver that includes a programmable vector processor in accordance with the exemplary embodiments of the present invention.

FIG. 2 is a block diagram 200 illustrating logic flows of data streams traveling through a transceiver that includes a programmable mixed-radix processor in accordance with the exemplary embodiments of the present invention. Diagram 200 includes user equipment ("UE") 216, uplink front end ("ULFE") 212, transceiver processing hardware ("TPH") 220, and base station 112. Base station 112 is capable of transmitting and receiving wireless signals 224 to and from TPH 220 via an antenna 222. It should be noted that the underlying concept of the exemplary embodiments of the present invention would not change if one or more devices (or base stations) were added or removed from diagram 200.

The TPH 220, in one example, includes MMSE 202, DFT/IDFT 204, and demapper 206, and is able to process and/or handle information between antenna 222 and a decoder. The information includes data and control signals wherein the control signals are used to facilitate information transmission over a wireless communication network. While MMSE may include an estimator able to provide an estimation based on prior parameters and values associated with bit streams, DFT/IDFT 204 converts symbols or samples between time and frequency domains. After conversion, DFT/IDFT 204 may store the symbols or samples in a storage matrix.

In one embodiment, DFT/IDFT 204 includes one or more programmable vector processors that determine DFT/IDFT values. Depending on the applications, DFT/IDFT 204 can transmit determined symbols to the next logic block such as demapper 208. In an exemplary embodiment, the storage matrix is a local storage memory which can reside in DFT/IDFT 204, demapper 206, or an independent storage location.

The MMSE 202, in one example, includes an equalizer with serial interference cancellation ("SIC") capability and provides possible processing paths between TPH and SIC path. MMSE 202, which can be incorporated in TPH 220, generates estimated value using a function of mean-square-error or equalization of received signals or bit stream(s) during the signal processing phase. MMSE 202 also provides functionalities to equalize multiple streams of data received simultaneously over the air. For instance, the number of bit streams such as one (1) to eight (8) streams can arrive at antenna 222 simultaneously. MMSE 202 also supports frequency hopping and multi-cluster resource block ("RB") allocations. Note that the frequency offset may be used to compensate channel estimates before performing time interpolation. Time interpolation across multiple symbols may be performed in multiple modes.

The Demapper 206, in one aspect, includes a first minimum function component ("MFC"), a second MFC, a special treatment component ("STC"), a subtractor, and/or an LLR generator. A function of demapper 206 is to demap or ascertain soft bit information associated to received symbol(s) or bit stream(s). For example, demapper 206 employs soft demapping principle which is based on computing the log-likelihood ratio (LLR) of a bit that quantifies the level of certainty as to whether it is a logical zero or one. To reduce noise and interference, demapper 206 is also capable of discarding one or more unused constellation points relating to the frequency of the bit stream from the constellation map.

In an exemplary embodiment, the DFT/IDFT 204 converts signals between the frequency domain and the time domain using a discrete Fourier transform ("DFT") and an inverse DFT ("IDFT"). The DFT and IDFT can be defined as;

$$DFT: X[k] = \sum_{n=0}^{N-1} x[n] W_N^{kn}$$

and $$IDFT: x[n] = \frac{1}{\sqrt{N}} \sum_{k=0}^{N-1} X[k] W_N^{-kn}$$

where $W_N = e^{-2\pi j/N}$.

In the above expressions, the output is properly scaled after all radix states so that the average power of DFT/IDFT output is the same as the input.

FIG. 3 is a table 300 showing DFT/IDFT sizes with respect to index and resource block ("RB") allocations in accordance with exemplary embodiments of the present invention. In one embodiment, LTE networks are generally required to support many different configurations using different DFT sizes with mixed radix computations. For example, an N-point DFT can be determine from the following radix factorization.

$$N=2^\alpha 3^\beta 5^\gamma$$

Thus, for a DFT of size N, a factorization can be determined that identifies the radix2, radix3 and radix5 computations to be performed to compute the DFT result. In various exemplary embodiments, the PVP operates to use a vector pipeline and associated vector feedback path to perform an iterative process to compute various radix factorizations when determining DFT/IDFT values.

Figure 4:
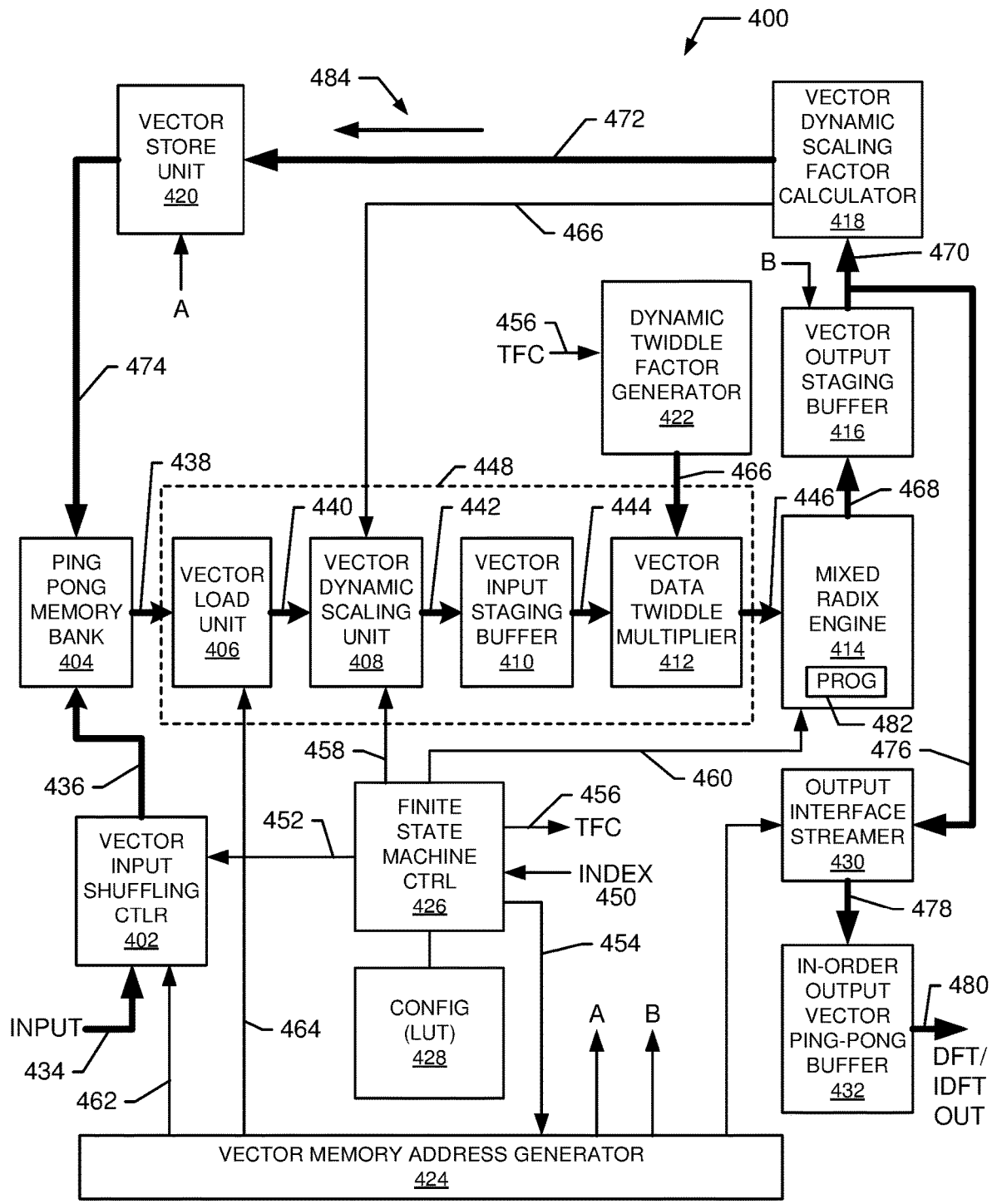
FIG. 4 is a block diagram illustrating an exemplary embodiment of a programmable vector processor in accordance with exemplary embodiments of the present invention.

FIG. 4 is a block diagram illustrating an exemplary embodiment of a PVP 400 in accordance with the present invention. In one embodiment, the PVP 400 comprise one single programmable vector mixed-radix engine 414 that is a common logic block reused for all the different radix sizes calculations. Thus, the vector engine 414 is reused iteratively as the ALU (Arithmetic Logic Unit) of the PVP 400. Complex control logic and memory sub-systems are used as described herein to load/store data in a multiple-stage radix computation by iteratively feeding data to the single vector mixed-radix engine 414. In another exemplary embodiment, multiple vector engines 414 are utilized.

Exemplary embodiments of the PVP 400 satisfy the desire for low power consumption and reduced hardware resources by iteratively reusing a single pipelined common vector data-path for all possible combinations of mixed-radix computations, yet still achieving streaming in/output data throughput of multiple samples/cycle with much less logic utilization. Besides its much higher performance to power/area ratio over conventional architectures, exemplary embodiments of the PVP 400 achieve much higher scalability and programmability for all possible mix-radix operations.

In an exemplary embodiment, the PVP 400 also comprises vector input shuffling controller 402, ping-pong memory bank 404, vector load unit 406, vector dynamic scaling unit 408, vector input staging buffer 410, vector data twiddle multiplier 412, vector output staging buffer 416, vector dynamic scaling factor calculator 418, vector store unit 420, dynamic twiddle factor generator 422, vector memory address generator 424, finite state machine controller 426, configuration list 428, output interface streamer 430, and in-order output vector ping-pong buffer 432. In an exemplary embodiment, the vector load unit 406, vector dynamic scaling unit 408, vector input staging buffer 410, and vector data twiddle multiplier 412 form a vector data-path pipeline 448 that carries vector data from the memory 404 to the vector mixed-radix engine 414. The vector output staging buffer 416, vector dynamic scaling factor calculator 418, and vector store unit 420 for a vector feedback data-path 484 that carries vector data from the vector mixed-radix engine 414 to the memory 404.

In an exemplary embodiment, the finite state machine controller 426 receives an index value 450 from another entity in the system, such as a central processor of the DFT/IDFT 204. Using the index value, the state machine 426 accesses the configuration information 428 to determine the size (N) of the DFT/IDFT to be performed. For example, the configuration information 428 includes the table 300 that cross-references index values with size (N) values. Once the DFT/IDFT size is determined, the state machine 426 accesses the configuration information 428 to determine a factorization that identifies the number and type of radix computations that need to be performed to complete the DFT/IDFT operation.

Once the radix factorization is determined, the state machine 426 provides input shuffling control signals 452 to the vector input shuffling controller 402 that indicate how input data 434 is to be written into the memory 404 to allow efficient readout into the vector pipeline 448. The state machine 426 also provides address control signals 454 to the vector memory address generator 424 that indicate how memory addresses are to be generated to read-out, store, move and otherwise process data throughout the PVP 400. The state machine 426 also generated twiddle factor control (TFC) signals 456 that are input to twiddle factor generator 422 to indicate how twiddle factor are to be generated for use by the twiddle multiplier 412. The state machine 426 also generates scaling control signals 458 that are input to the scaling unit 408 to indicate how pipeline vector data is to be scaled. The state machine 426 also generates radix engine control signals 460 that indicate how the mixed radix engine is to perform the DFT/IDFT calculations based on the radix factorization.

In an exemplary embodiment, the vector input shuffling controller 402 receives streaming input data 434 at the draining throughput of the previous module in the system with a rate of up to 12 samples/cycle. However, this is exemplary and other rates are possible. The shuffling controller 402 uses a vector store operation to write the input data 434 into the ping-pong vector memory bank 404. For example, the shuffling controller 402 receives the control signals 452 from the state machine 426 and address information 462 from the address generator 424 and uses this information to shuffling and/or organize the input data 434 so that it can be written into the memory bank 404. For example, parallel data path 436 carries parallel input data to be written to the ping-pong memory bank 404. After the shuffling operation, all the data are stored in a matrix pattern in the ping-pong vector memory bank 404 to allow efficient data read-out to facilitate the selected multi-stage radix-operation with in-order write-back. In an exemplary embodiment, the ping-pong memory bank 404 includes "ping" and "pong" memory banks that may be selectively written to or read from to facilitate efficient data flow.

In an exemplary embodiment, the vector load unit 406 reads the data in parallel for the multiple radix-operations from either the ping or pong memory banks 404 to feed the down-stream operations. For example, the vector load unit 406 receives address information 464 from the address generator 424 which indicates how data is to be read from the memory bank 404. For example, parallel data path 438 carries parallel data read from the ping-pong memory banks 404 to the vector load unit 406. The vector load unit 406 can generate full throughput (e.g., 12 samples/cycle) at the output of vector load unit 406 with no interruption. For example, parallel data path 440 carries parallel data output from the vector load unit 406 to the scaling unit 408.

In an exemplary embodiment, the vector dynamic scaling unit 408 scales all the parallel samples within one cycle to keep the signal amplitude within the bit-width of the main data-path after each stage of radix computation. A scaling factor 466 is calculated by the vector dynamic scaling factor calculator 418 without stalling the pipeline for each iteration. The scaling factor 466 and the scaling control signals 458 are used by the vector dynamic scaling unit 408 to perform the scaling operation. For example, parallel data path 442 carries scaled parallel data output from the vector dynamic scaling unit 408 after the scaling operation is performed.

In an exemplary embodiment, the vector input staging buffer 410 comprises an array of vector registers that are organized in a matrix pattern. The scaled vector-loaded data originating from the main ping-pong memory bank 404 and carried on data path 442 is written column-wise into the array of vector staging registers. The registers are then read out row-wise to form the parallel data input to the vector data twiddle multiplier 412. For example, the data path 444 carries parallel data output from the vector input staging buffer 410 to the vector data twiddle multiplier 412.

In an exemplary embodiment, vector data twiddle multiplier 412 multiplies the scaled and staged samples with twiddle factors received by the dynamic twiddle factor generator 422 over signal path 466. The dynamic twiddle factor generator 422 receives the TFC 456 and generates twiddle factors to be multiplied with the scaled data. The vector data twiddle multiplier 412 generates 12 samples/cycle of input for radixes (2,3,4,6) scenarios or 10-samples for the radix-5 scenario to feed into the programmable vector mix-radix engine 414 using signal path 446.

The mixed-radix engine 414 uses a pipelined data-path to implement multiple vector radix operations for all the different radix-factorization schemes. It is controlled by a radix-mode program controller 482 within the engine for each iteration stage. The engine data-path reuses the same logic for all the different combinations of radix operations. As an example, it can reuse the common functional logic to compute multiple radix3, radix4, radix5 and radix6 computations with no pipeline stall. For example, in an exemplary embodiment, the engine 414 can be reconfigured to compute four (4) radix3, three (3) radix4, two (2) radix5, or two (2) radix6 computations with no pipeline stall. A more detailed description of the mixed radix engine 414 is provided below.

The vector memory address generator 424 operates to provide memory address and control information to the vector input shuffling controller 402, vector load unit 406, vector store unit 420 (see A), vector output staging buffer 416 (see B), and the output interface streamer 430. The addresses coordinate the flow of data into the memory bank 404 and through the pipeline 448 to the mixed radix engine 414. Processed data is output from the engine 414 and input to the vector output staging buffer 416 on the vector feed-back data path 484 that leads back to the ping-pong memory 404. For example, after the data passes through the vector dynamic scaling factor calculator 418, it flows to the vector store unit 420, which uses the address information (A) it receives to store the data back into the ping-pong memory 404.

In an exemplary embodiment, the PVP 400 determines a DFT/IDFT conversion by performing multiple iterations where in each iteration, a particular radix calculation is performed. Thus, in an exemplary embodiment, after performing intermediate radix computations, the intermediate results are stored back into the memory 404. For example, the intermediate radix results are output to the vector output staging buffer 416 using the vector data path 468. The vector output staging buffer 416 uses address and control information (B) received from the address generator 424 to receive the intermediate radix results and output the results in an appropriate order the vector dynamic scaling factor calculator 418 using vector data path 470.

The vector dynamic scaling factor calculator 418 calculates scaling factors from the received radix results and outputs the scaling factors 466 to the dynamic scaling factor unit 408. The radix results are then forward to the vector store unit 420 using vector data path 472. The vector store unit 420 receive address and control information (A) from the address generator 424 and stored the received vector data in the ping-pong memory bank 404 according to the received control and address information. In an exemplary embodiment, the intermediate vector radix results are stored in-place corresponding to the data that was used to generate the radix results. In an exemplary embodiment, the staging buffer 416, scaling factor calculator 418 and vector store unit 420 form a vector feedback data path 484 to allow results from the mixed radix engine 414 to be stored into the memory 404.

In an exemplary embodiment, a final iteration is performed where the mixed radix engine 414 computes a resulting DFT/IDFT. The results are output from the output staging buffer 416 to the output interface streamer 430 using vector data path 476. The output interface streamer 430 receive processed data from the mixed radix engine 414 and outputs this data to the in-order output vector ping-pong buffer 432 using the vector data path 478. The in-order output vector ping-pong buffer 432 outputs the DFT/IDFT data 480 to downstream entities in the correct order.

Computational Iterations

In an exemplary embodiment, the PVP 400 operates to compute a desired DFT/IDFT using multiple iterations where in each iteration a particular radix calculation is performed. For example, the PVP 400 initially computes a radix factorization to determine the radix computations to be made to compute the DFT/IDFT for the given point size N. Data is stored in the memory 404 and read out into the vector pipeline 448 where it is scaled, staged, and multiplied by twiddle factors. The results are input to the mixed radix engine 414 that is configured to perform a first radix computation. The intermediate radix result is written back to the memory bank 404 using the vector feedback path 484. A next iteration is performed to compute the next radix factor. The radix engine 414 is reconfigured to compute this next radix factor. The iterations continue until the complete DFT/IDFT is computed. The radix engine 414 then outputs the final result through the output staging buffer 416 to the output interface streamer 430 using path 476. Thus, to determine an N-point DFT/IDFT, a radix factorization is determined that is used to perform a selected number of iterations to calculate each radix factor. For each iteration the radix engine 414 is reconfigured to compute the desired radix computation. As a result, the PVP 400 uses a pipeline architecture to compute DFT/IDFT values with high speed and efficiency, while the reconfigurable radix engine 414 utilizes fewer resources.

Figure 5:
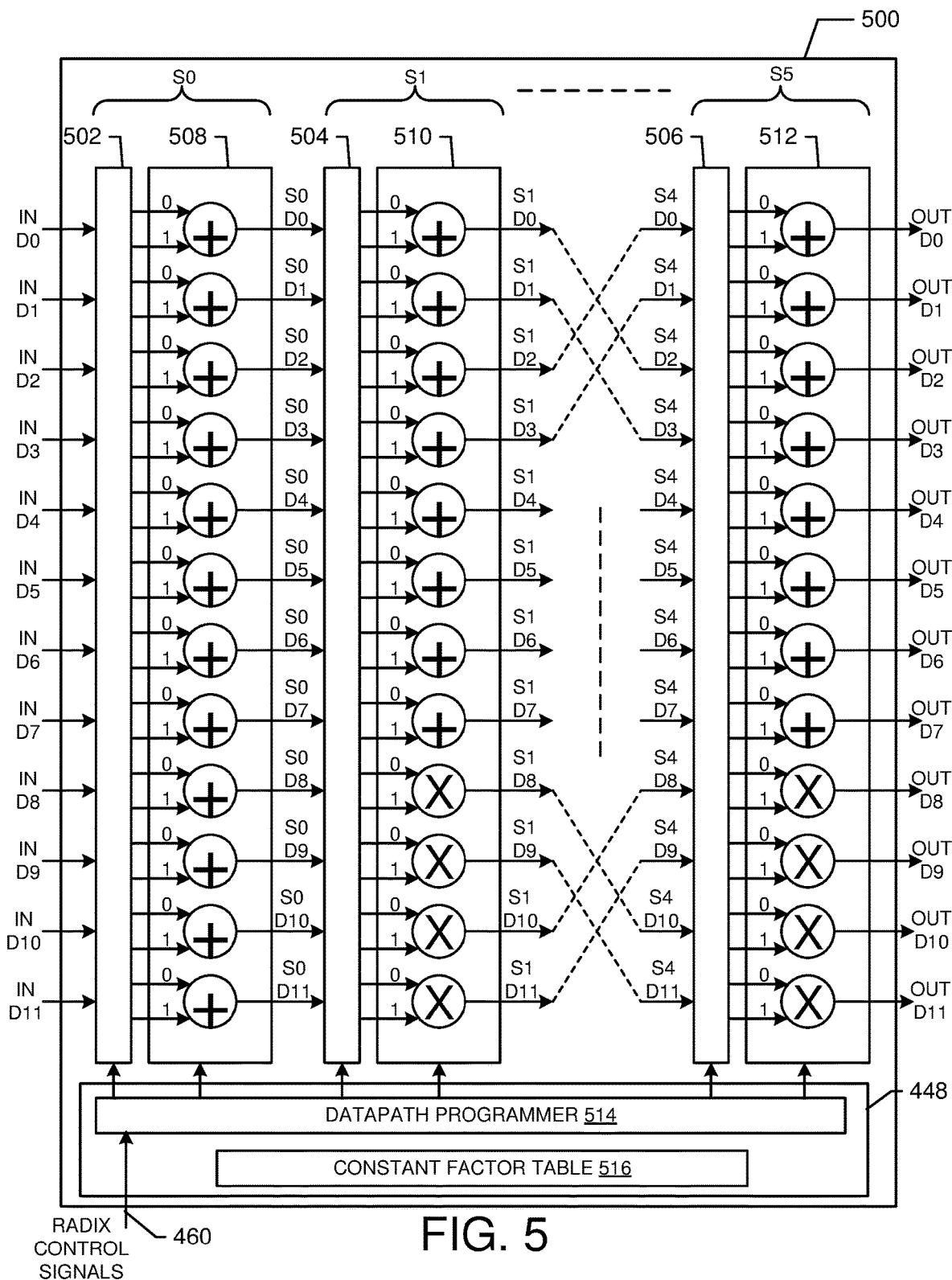
FIG. 5 is a block diagram illustrating a detailed exemplary embodiment of a programmable vector mixed-radix processor in accordance with exemplary embodiments of the present invention.

FIG. 5 is a block diagram illustrating a detailed exemplary embodiment of a programmable vector mixed-radix processor 500 in accordance with exemplary embodiments of the present invention. For example, the processor 500 is suitable for use as the programmable vector mixed-radix engine 414 shown in FIG. 4. The processor 500 includes multiple stages (S0-S5) that include complex ALU (Arithmetic Logic Unit) Arrays (e.g., shown at 508, 510, and 512) and connecting multiplexers (e.g., shown at 502, 504 and 506). The multiplexers and the ALUs of the stages (S0-S5) are configurable to allow the processor 500 to perform R2, R3, R4, R5, and R6 radix computations.

In an exemplary embodiment, the radix-mode program controller 482 comprises the data-path programmer 514 and the LUT 516. The data-path programmer 514 comprises at least one of logic, a processor, CPU, state machine, memory, discrete hardware and/or other circuitry that operates to allow the programmer 514 to reconfigure the ALU arrays and multiplexers based on the received radix engine control signals 460. A small LUT (Look Up-Table) 516 holds a set of constant scaling values for the radix equations.

In an exemplary embodiment, vector input data (IN D0-D11) is received at the mux 502. The vector input data is received from the twiddle multiplier 412 such that the generated twiddle factors have already been applied to the data. The mux 502 is configured by the programmer 514 based on the received radix engine control signals 460 to connect the input data to the ALU 508 in a particular connection pattern. The ALU 508 is configured by the programmer 514 to perform arithmetic operations (such as add the data and/or constants together) based on the received radix engine control signals 460. The results of the arithmetic operations of the ALU 508 (S0 D0-D11) are input to the mux 504 of stage S1.

In an exemplary embodiment, the stage S1 operates similarly to the stage S0. The mux 504 receives the data (S0 D0-D11) output from the stage S0 and connects this input data to the ALU 510 in a particular connection pattern. The mux 504 is configured by the programmer 514 based on the received radix engine control signals 460. The ALU 510 is configured by the programmer 514 to perform arithmetic operations (such as add and/or multiply the data and/or constants together) based on the received radix engine control signals 460. The results of the arithmetic operations of the ALU 510 (S1 D0-D11) are input to the mux of stage S2 (not shown).

In an exemplary embodiment, the stages S2-S4 operates similarly to the stage S1. The stage S4 outputs data (S4 D0-D11) that has been processed by these stages configured by the programmer 514 according to the received radix control signals 460. The mux 506 of the stage S5 receives the data processed by the stage S4 and connects this input data to the ALU 512 in a particular connection pattern. The mux 506 is configured by the programmer 514 based on the received radix engine control signals 460. The ALU 512 is configured by the programmer 514 to perform arithmetic operations (such as add and/or multiply the data and/or constants together) based on the received radix engine control signals 460. The results of the arithmetic operations of the ALU 512 (OUT D0-D11) are output from the processor 500. Thus, the processor 500 is re-configurable to perform a variety of radix computations on data received from the twiddle multiplier 412 of the pipeline 448. The radix computations include radix3, radix4, radix5 and radix6 DFT computations.

Figure 6:
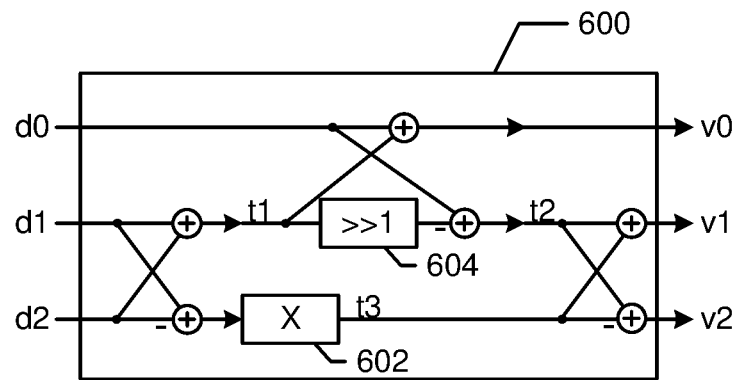
FIG. 6 is a block diagram of a radix3 configuration for use with the programmable vector mixed-radix processor in accordance with exemplary embodiments of the present invention.

FIG. 6 is a block diagram of a radix3 configuration 600 for use with the programmable vector mixed-radix processor 500 in accordance with exemplary embodiments of the present invention. For example, the stages (S0-S5) of the processor 500 can be configured to perform a radix3 computation using the configuration 600. In an exemplary embodiment, three data bits (d0-d2) are input to the configuration 600. The input data is added and a multiplication block 602 and a shift block 604 are utilized to generate three output bits (v0-v2) that represent the radix3 computation.

Figure 7:
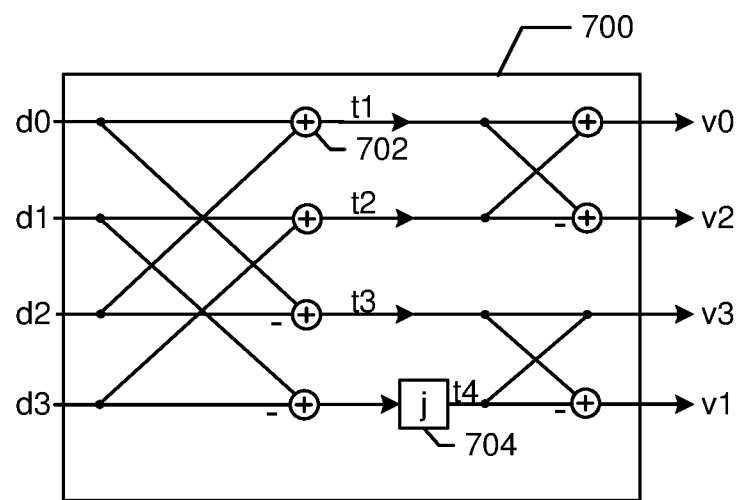
FIG. 7 is a block diagram of a radix4 configuration for use with the programmable vector mixed-radix processor in accordance with exemplary embodiments of the present invention.

FIG. 7 is a block diagram of a radix4 configuration 700 for use with the programmable vector mixed-radix processor 500 in accordance with exemplary embodiments of the present invention. For example, the stages (S0-S5) of the processor 500 can be configured to perform a radix4 computation using the configuration 700. In an exemplary embodiment, four data bits (d0-d3) are input to the configuration 700. The input data is added and a multiplication block 704 is utilized to generate four output bits (v0-v3) that represent the radix4 computation.

Figure 8:
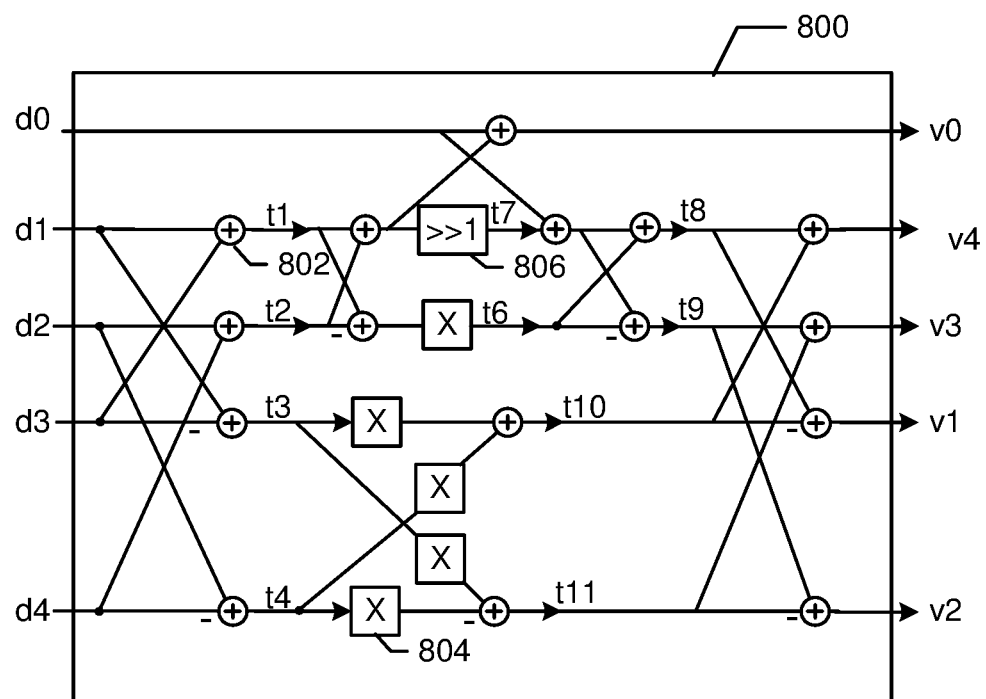
FIG. 8 is a block diagram of a radix5 configuration for use with the programmable vector mixed-radix processor in accordance with exemplary embodiments of the present invention.

FIG. 8 is a block diagram of a radix5 configuration 800 for use with the programmable vector mixed-radix processor 500 in accordance with exemplary embodiments of the present invention. For example, the stages (S0-S5) of the processor 500 can be configured to perform a radix5 computation using the configuration 800. Five data bits (d0-d4) are input to the configuration 800. Addition blocks (e.g., 802), multiplication blocks (e.g., 804), and shift block 806 are utilized to generate five output bits (v0-v4).

Figure 9:
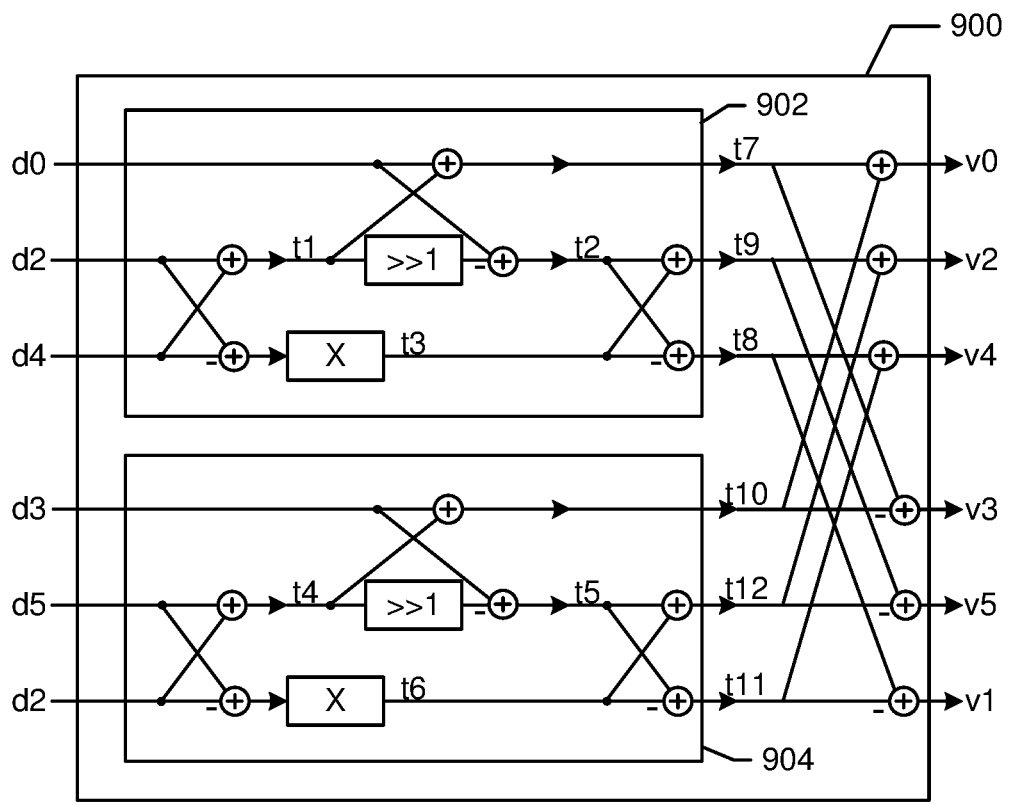
FIG. 9 is a block diagram of a radix6 configuration for use with the programmable vector mixed-radix processor in accordance with exemplary embodiments of the present invention.

FIG. 9 is a block diagram of a radix6 configuration 900 for use with the programmable vector mixed-radix processor 500 in accordance with exemplary embodiments of the present invention. For example, the stages (S0-S5) of the processor 500 can be configured to perform a radix6 computation using the configuration 900. Six data bits (d0-d5) are input to the configuration 900. The data bits are input to two blocks 902 and 904 that are configured for radix3 operation as shown in block 600. The outputs of the block 902 and 904 are combined to generate six output bits (v0-v5).

Figure 10:
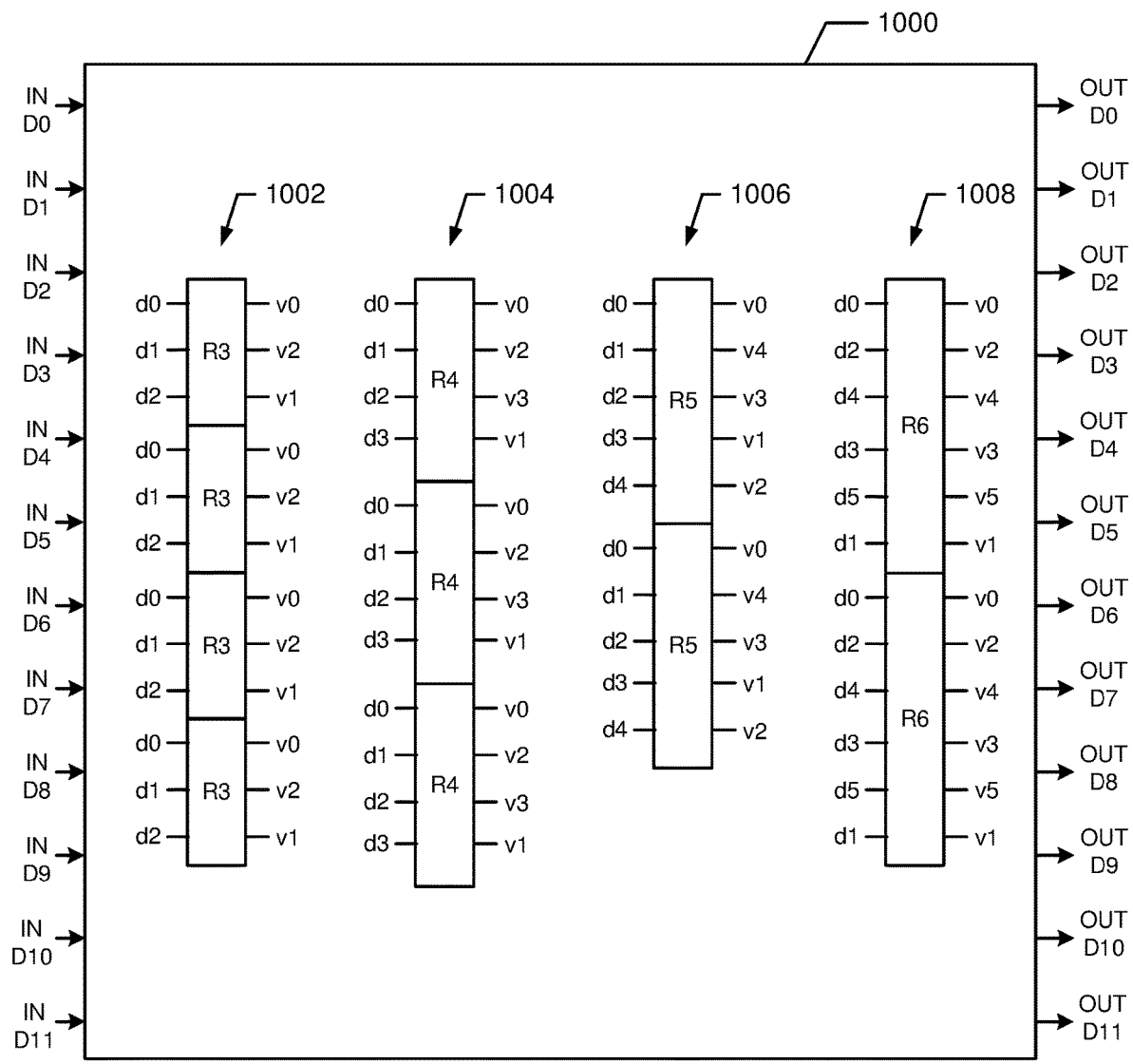
FIG. 10 is a block diagram illustrating a configurable vector mixed-radix engine in accordance with one embodiment of the present invention.

FIG. 10 is a block diagram illustrating a configurable vector mixed-radix engine 1000 in accordance with one embodiment of the present invention. For example, the engine 1000 is suitable for use as the engine 500 shown in FIG. 5. The engine 1000 comprises a radix-operator datapath that is configured to compute selected radix modes. In an exemplary embodiment, the radix-mode can be four parallel radix3 computations (4vR3 as shown in block 1002), or three parallel radix4 computations (3vR4 as shown in block 1004), or two parallel radix5 computations (2vR5 in block 1006), or two parallel radix6 computations (2vR6 in block 1008). After each configuration is selected, data can be pipelined into each run-time data-path with no stall within the iteration stage. The input and output of 12-samples are selected according to the radix-mode and stage index based on the DFT/IDFT algorithm.

Figure 11:
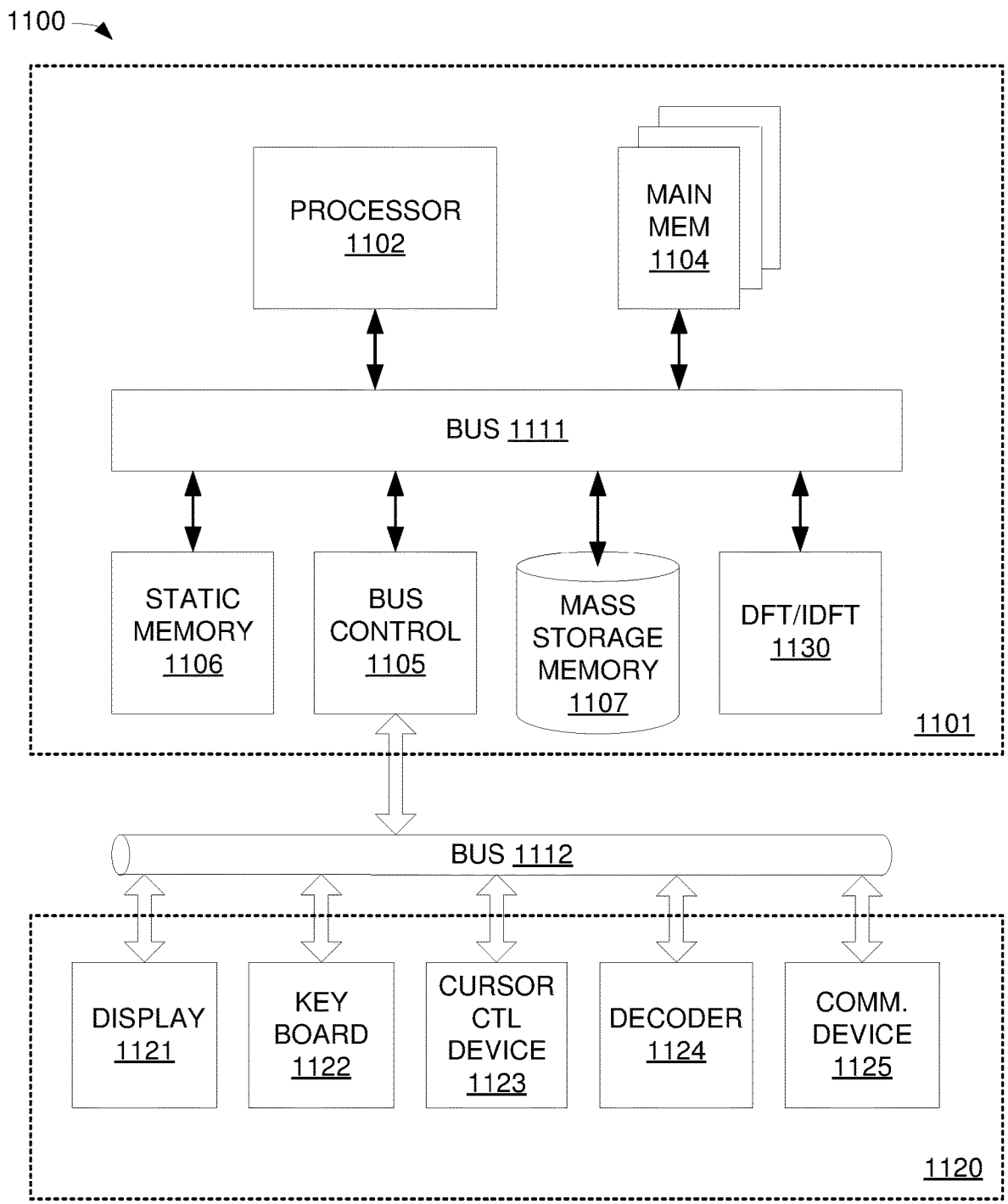
FIG. 11 illustrates an exemplary digital computing system that comprises a programmable vector processor having a configurable vector mixed-radix engine with iterative pipeline in accordance with embodiments of the invention.

FIG. 11 illustrates an exemplary digital computing system 1100 that comprises a programmable vector processor having a configurable vector mixed-radix engine with iterative pipeline in accordance with embodiments of the invention. It will be apparent to those of ordinary skill in the art that the programmable mixed-radix processor with iterative pipelined vector engine is suitable for use with other alternative computer system architectures.

Computer system 1100 includes a processing unit 1101, an interface bus 1112, and an input/output ("TO") unit 1120. Processing unit 1101 includes a processor 1102, main memory 1104, system bus 1111, static memory device 1106, bus control unit 1105, and mass storage memory 1107. Bus 1111 is used to transmit information between various components and processor 1102 for data processing. Processor 1102 may be any of a wide variety of general-purpose processors, embedded processors, or microprocessors such as ARM® embedded processors, Intel® Core™2 Duo, Core™2 Quad, Xeon®, Pentium™ microprocessor, AMD® family processors, MIPS® embedded processors, or Power PC™ microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Mass storage memory 1107 may be a magnetic disk, solid-state drive ("SSD"), optical disk, hard disk drive, floppy disk, CD-ROM, and/or flash memories for storing large amounts of data.

I/O unit 1120, in one example, includes a display 1121, keyboard 1122, cursor control device 1123, decoder 1124, and communication device 1125. Display device 1121 may be a liquid crystal device, flat panel monitor, cathode ray tube ("CRT"), touch-screen display, or other suitable display device. Display device 1121 projects or displays graphical images or windows. Keyboard 1122 can be a conventional alphanumeric input device for communicating information between computer system 1100 and computer operator(s). Another type of user input device is cursor control device 1123, such as a mouse, touch mouse, trackball, or other type of cursor for communicating information between system 1100 and user(s).

Communication device 1125 is coupled to bus 1111 for accessing information from remote computers or servers through wide-area network. Communication device 1125 may include a modem, a router, or a network interface device, or other similar devices that facilitate communication between computer 1100 and the network. In one aspect, communication device 1125 is configured to perform wireless functions.

In one embodiment, DFT/IDFT component 1130 is coupled to bus 1111 and is configured to provide a high speed programmable vector processor having a configurable vector mixed-radix engine with iterative pipeline in accordance with embodiments of the invention. For example, DFT/IDFT 1130 can be configured to include the PVP 400 shown in FIG. 4. The DFT/IDFT component 1130 can be hardware, hardware executing software, firmware, or a combination of hardware and firmware. For example, the component 1130 operates to receive streaming data and compute a desired N-point DFT that is output from the component 1130. Accordingly, the component 1130 may also operate to compute a desired IDFT.

Figure 12:
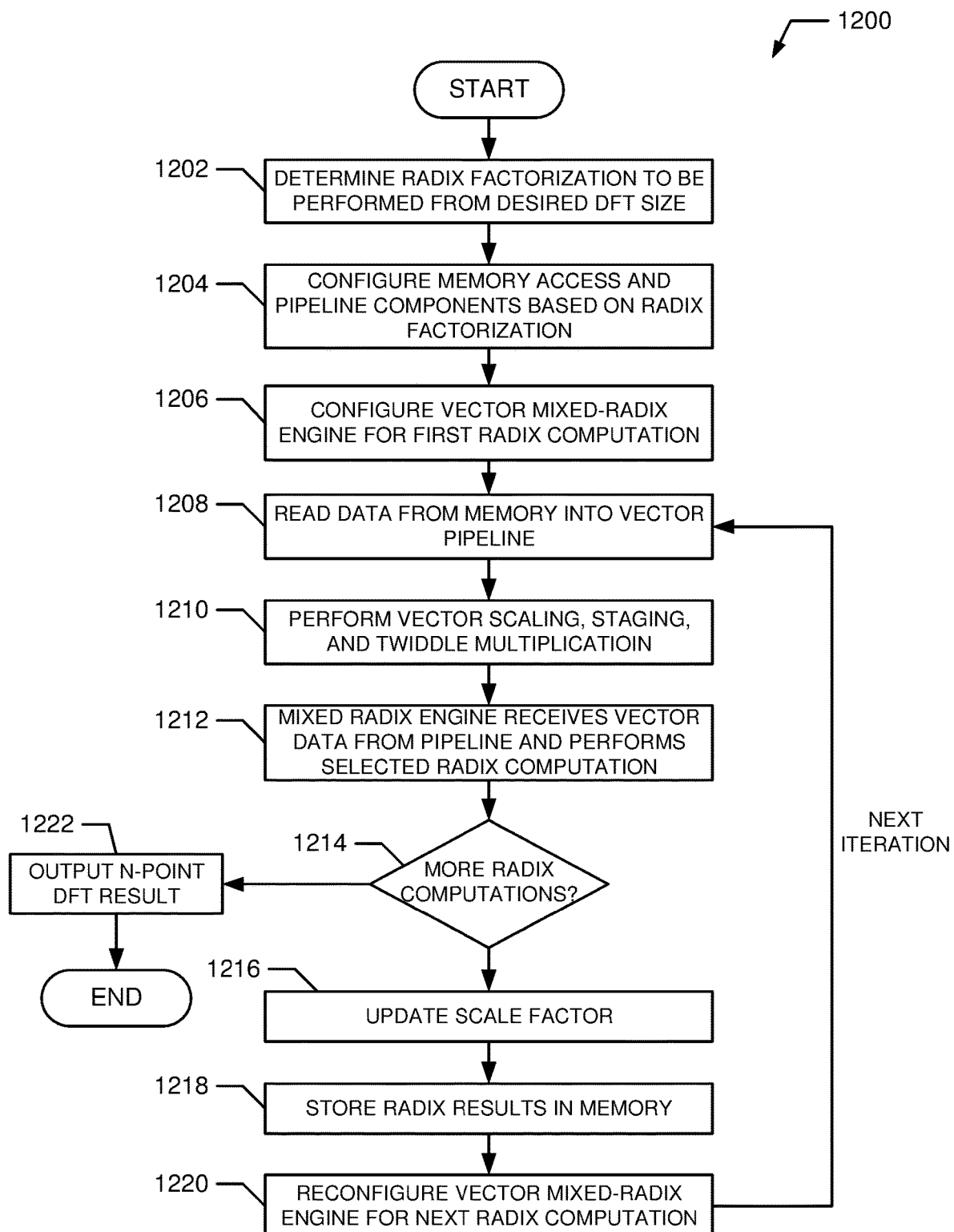
FIG. 12 illustrates an exemplary method for operating a programmable vector processor having a configurable vector mixed-radix engine with iterative pipeline in accordance with embodiments of the invention.

FIG. 12 illustrates an exemplary method 1200 for operating a programmable vector processor having a configurable vector mixed-radix engine with iterative pipeline in accordance with embodiments of the invention. For example, the method 1200 is suitable for use with the PVP 400 shown in FIG. 4.

At block 1202, a radix factorization is determined. For example, a radix factorization is determined to compute an N-point DFT associated with a particular index value. For example, the index value 450 for the N-point DFT to be computed is received at the state machine controller 426, which accesses the configuration information 428 to determine a radix factorization which can be used to compute the DFT.

At block 1204, memory accesses and pipeline components are configured based on the radix factorization. For example, based on the determined radix factorization, the state machine controller 426 determines how many iterations and radix computations it will take to compute the desired DFT. The state machine 426 outputs control signals 452 to the shuffling controller 402 to control how input data is stored in the memory 404. The state machine 426 outputs control signals 454 to control how memory addresses and control signals are generated by the address generator 424. These addresses and control signals are used control how data is transmitted through the vector pipeline 448 and the vector feedback path 484 for each iteration of the DFT computation.

At block 1206, the configurable vector mixed-radix engine is configured to perform a first radix computation. For example, the state machine 426 outputs radix control signals 460 to the program controller 448 and the programmer 514 uses these signals to configure the stages (S0-S5) (e.g., vector engines) of the mixed-radix engine 500 to perform the selected radix computation, such as a radix3, radix4, radix5, or radix 6 computation. For example, the stages are configured to one of the configurations shown in FIG. 10 to perform the selected radix computation.

At block 1208, vector data is read from the memory into the vector pipeline. For example, input data stored in the memory 404 is read out and input to the pipeline 448. In an exemplary embodiment, the vector data is input to the pipeline 448 at a rate of 12 samples per cycle.

At block 1210, vector scaling, staging, and twiddle factor multiplication of the vector data is performed. For example, the vector data is scaled by the scaling unit 408, staged by the staging buffer 410, and multiplied by twiddle factors at the twiddle multiplier 412.

At block 1212, the selected radix computation is performed. For example, the mixed-radix engine 500 performs the selected radix computation, such as a radix3, radix4, radix5, or radix 6 computation) as configured by the programmer 514.

At block 1214, a determination is made as to whether additional radix computations are required to complete the computation of the desired DFT. If additional radix computations are required, the result is output on the vector feedback path 484 to the staging buffer 416 and the method proceeds to block 1216. If no additional computations are required and the computation of the DFT is complete, the method proceeds to block 1222.

At block 1216, a scaling factor is updated. For example, the results of the radix computation flow to the scaling factor calculator 418, which calculates a new scaling factor and outputs this scaling factor 466 to the scaling unit 408.

At block 1218, the result of the radix computation is stored in memory. For example, the results of the radix computation a stored in the memory 404 by the vector store unit 420. In an exemplary embodiment, the radix result is stored (in-place) at the same memory locations as the initial data used to compute the result.

At block 1220, the mixed-radix engine 500 is reconfigured to perform the next radix calculation. For example, the state machine 426 outputs radix control signals 460 to the program controller 448 and the programmer 514 uses these signals to configure the stages (S0-S5) (e.g., vector engines) of the mixed-radix engine 500 to perform the next radix computation, such as a radix3, radix4, radix5, or radix 6 computation. For example, the stages are configured to one of the configurations shown in FIG. 10 to perform the selected radix computation. The method then proceeds to block 1208 to perform the next iteration.

At block 1222, the N-point DFT is output. For example, the mixed radix engine 414 outputs the DFT result through the output staging buffer 416 to the output interface streamer 430, which is turn streams the result to the buffer 432. The buffer 432 then outputs the DFT result to a downstream entity.

Thus, the method 1200 illustrates a method for operating a programmable vector processor having a configurable vector mixed-radix engine with iterative pipeline in accordance with embodiments of the invention. In an exemplary embodiment, the method is computes an N-point DFT as described above. In another exemplary embodiment, the method computes an N-point IDFT. For example, to compute the IDFT, at block 1210, the twiddle factors are adjusted (e.g., sign change) such that the result is an IDFT. Accordingly, the method 1200 operates to compute either a DFT or an IDFT in accordance with the exemplary embodiments.

Vector Memory Subsystem

Memory organization and addressing procedure provide an important role in achieving high Data-Level-Parallelism ("DLP") for high throughput DFT/IDFT engine design with efficient logic resource utilization. In exemplary embodiments, the vector memory subsystem ("VMS") as shown in FIG. 4 is formed by the vector input shuffling controller 402, ping-pong vector memory bank 404, vector memory address generator 424, finite state machine controller 426 and the configuration LUT 428. The VMS generates memory addresses for each stage of the pipelined DFT/IDFT operation. It should be noted that although VMS illustrated in FIG. 4 is directed to the framework of DFT architecture, it is applicable in other architecture contexts.

In one aspect, the VMS discloses a method and apparatus for efficient layout and organization of the ping-pong vector memory banks 404, which are reused in different configurations for radix-operations in various DFT sizes and configurable radix-factorizations. The VMS, in one embodiment, also includes the vector memory address generator ("VMAG") 424. VMAG 424 is able to provide a multi-sector/multi-bank memory organization mechanism to allow a high level of Data-Level Parallelism ("DLP") and a vector shuffling operation with write (WR) address generation based on various configurable parameters (e.g., radix-factorization vector, DFT_index and current stage etc) to store the initial input data into multi-section vector memory. VMAG 424 is also configured to provide a vector load method and procedure with read (RD) address generation to feed the vector DFT engine. The VMAG 424 also provides a vector store method and procedure with write-back address generation to write-back intermediate results to the ping-pong memory bank 404. VMAG 424 also provides an efficient write-out method and procedure to stream out the vector results at the last-stage through interface streamer 430. Note that VMS using the VMAG 424 allows up to 12 samples/cycle vector store/load, and is the key to achieving greater than 2 samples/cycle throughput in the DFT/IDFT implementation.

It should be noted that even for different architectures, computation of the DFT/IDFT involves the same multi-stage computations. The address generation is closely related to the iterative computation process of the DFT/IDFT algorithm. In an exemplary embodiment, the DFT/IDFT is calculated in an iterative procedure following the "divide & conquer" principle as follows.

A. A large data block is divided into smaller equal-sized blocks and then processed with smaller sized-DFT on divided sub-blocks.
B. For example, in DIT (Decimation-In-Time) the dividing process is in the backward direction from output to input;
C. For a stage of Radix-r, r sub-blocks of size n are merged into r*n sized parent sub block.

The iterative algorithm works in multiple stages to generate the final result of an N-point DFT/IDFT. For example, if the last stage is a radix-r, it is generated from r sub-blocks of $$n = \frac{N}{r}$$

point FFT. For example, assuming data stored in a data matrix from the previous stage output as:

$$D_{r \times n} = \begin{bmatrix} d_{0,0} & d_{0,1} & d_{0,2} & \ldots & d_{0,n-1} \\ d_{1,0} & d_{1,1} & d_{1,2} & \ldots & d_{1,n-1} \\ d_{2,0} & d_{2,1} & d_{2,2} & \ldots & d_{2,n-1} \\ \ldots & & & & \\ d_{r-1,0} & d_{r-1,1} & d_{0,2} & \ldots & d_{r-1,n-1} \end{bmatrix}_{r \times n} \quad (1)$$

where each row is a sub-block of size n, the output of an n-point FFT. Let the twiddle factors also be stored in a matrix format as:

$$T_{r \times n} = \begin{bmatrix} 1 & 1 & 1 & \ldots & 1 \\ 1 & W^1 & W^2 & & W^{(n-1)} \\ 1 & W^2 & W^4 & & W^{2(n-1)} \\ \vdots & & & & \\ 1 & W^{(r-1)} & W^{2(r-1)} & & W^{(r-1)(n-1)} \end{bmatrix}_{r \times n}, W = e^{-j\frac{2\pi}{r \times n}}. \quad (2)$$

where $\tilde{D}_{r \times n} = D_{r \times n} \circ T_{r \times n}$ is the Hadamard product of the data matrix and the twiddle factor matrix. Then each column of $\tilde{D}_{r \times n}$ will be the input of the radix-r operator.

Figure 13:
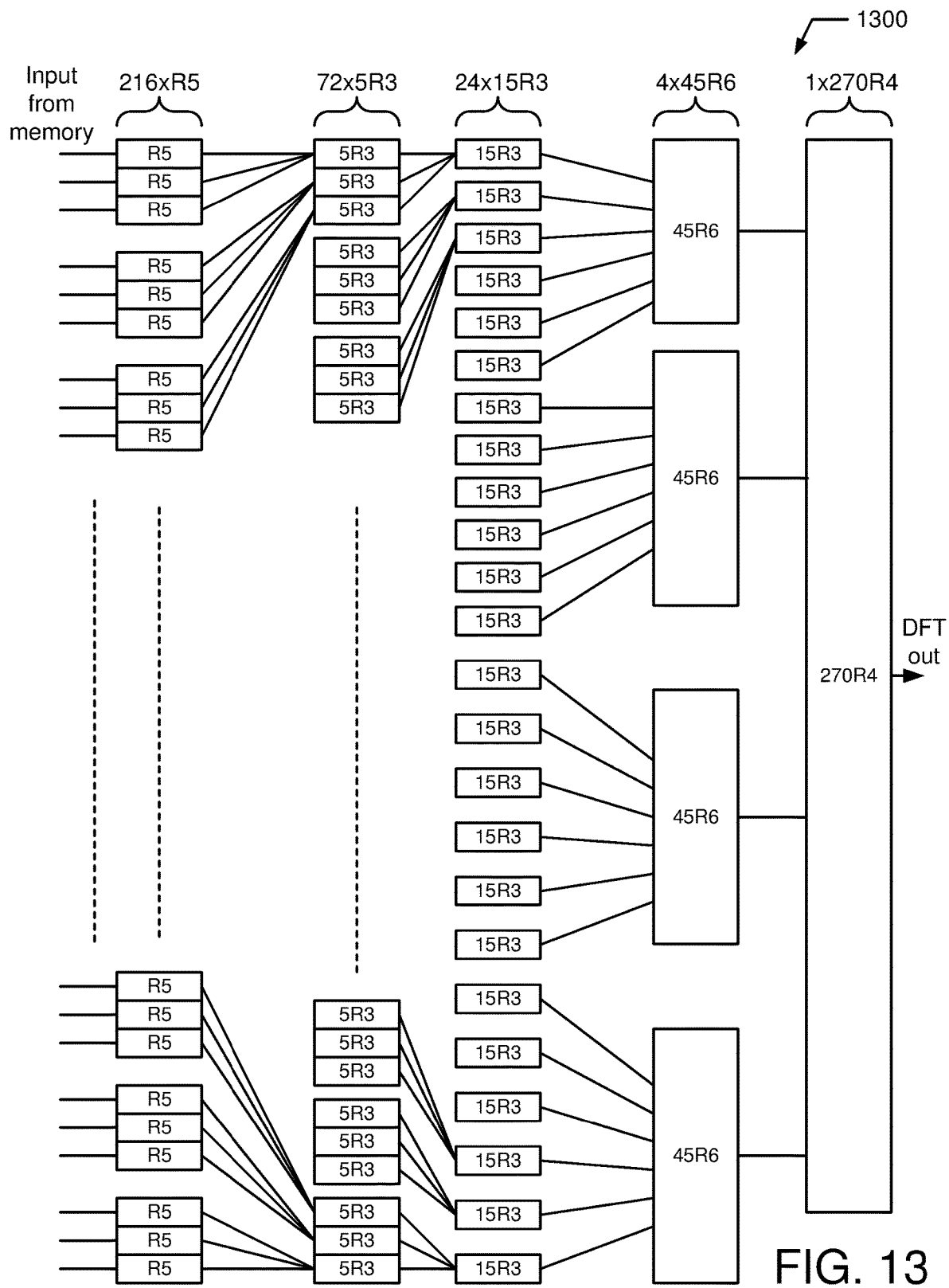
FIG. 13 illustrates an exemplary embodiment of a 1080-point DFT configuration with radix factorization having five stages as in RV=[5,3,3,6,4] in accordance with embodiments of the invention.

FIG. 13 illustrates an exemplary embodiment of a 1080-point DFT configuration 1300 with radix factorization having five stages as in RV=[5,3,3,6,4] in accordance with the exemplary embodiments of the invention. The configuration 1300 shows the multiple stage computation procedure from r smaller DFT size n to form multiple larger DFT of size r×n. In each stage, the memory is organized as a single serial memory that only allows one read/write access per clock cycle. Thus, the processing throughput is quite limited.

Figure 14:
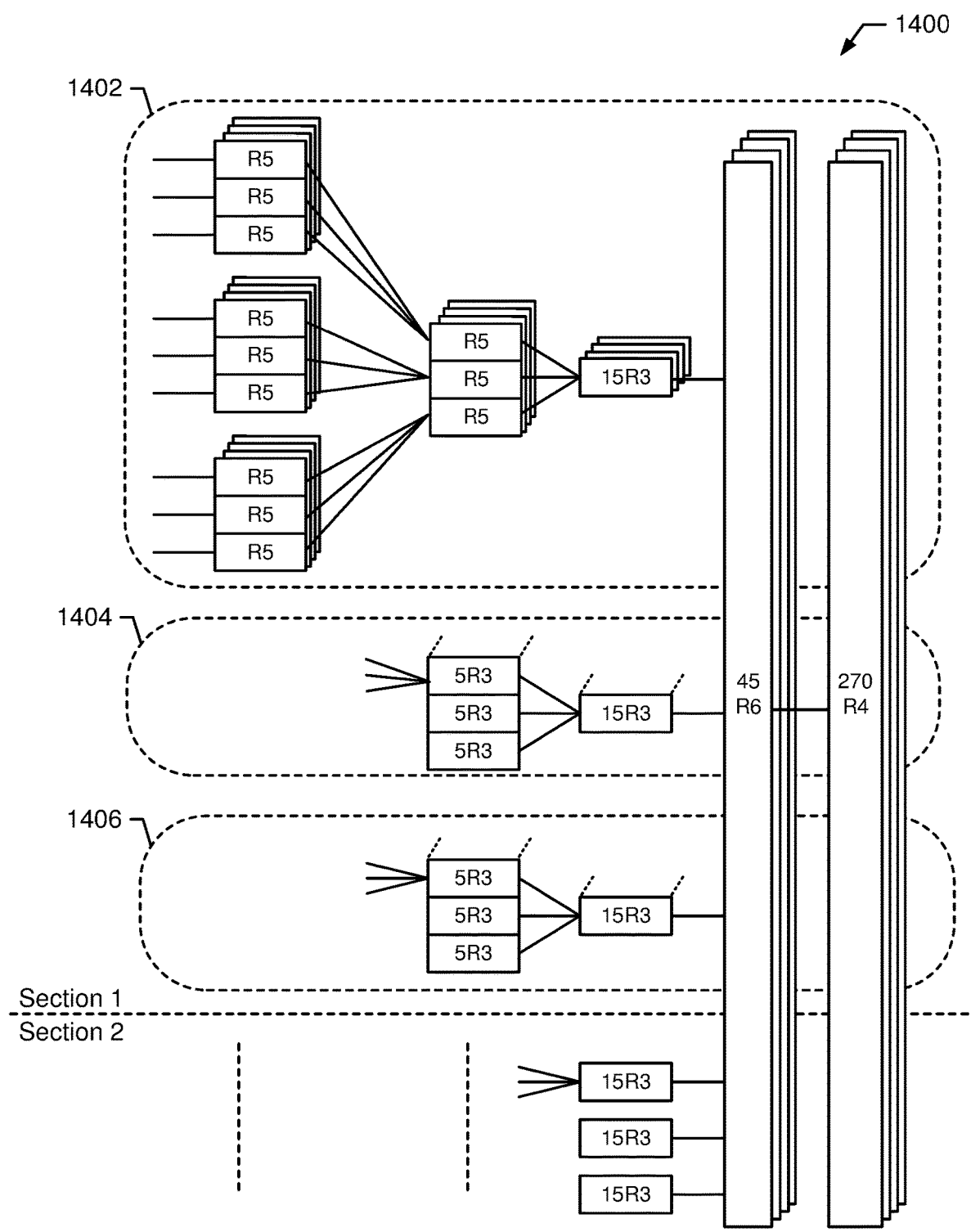
FIG. 14 illustrates an exemplary embodiment of a memory configuration for a 1080-point DFT that utilizes a virtual folded memory with iterative DFT process in accordance with the exemplary embodiments of the invention.

FIG. 14 illustrates an exemplary embodiment of a memory configuration 1400 for a 1080-point DFT that utilizes a virtual folded memory with iterative DFT process in accordance with the exemplary embodiments of the invention. In the configuration 1400, the radix factorization includes the five stages as in RV=[5,3,3,6,4]. In an exemplary embodiment, the VMS organizes the memory to support Single-Instruction Multiple-Data (SIMD) to output 12 samples per cycle (e.g., single access). The VMS sets up an iterative DFT process with three virtual memory banks (shown at 1402, 1404, and 1406) of SIMD width of 4 (SIMD4), or 1 bank of SIMD width of 12 (SIMD12), by utilizing the data level parallelism of the independent smaller size DFT computations in the stages before the last two stages.

The following parameters are defined for the multi-stage iterative address generation:

| | | |
|---|---|---|
| A. | Ns: | Number of stages; |
| B. | N_DFT: | the length of the DFT data; |
| C. | RV[Ns]: | the radix vector factorization; |
| D. | CurRadix: | r in the above equations, the radix size for current stage; |
| E. | SBSizeIn: | n in the above equations, the DFT size of previous stage, i.e., input sub-block size for current stage; |
| F. | N_SBlks: | The number of independent r × n sub block DFTs for a length N_DFT data. |
| G. | NFFT_CurStage: | The DFT size of the current stage, which is = r × n. |

The features of the vector memory design, in one embodiment, include the virtual folded parallel memory with iterative procedure of SIMD12 using the single-port ping-pong memory buffer 404 to achieve the data-level parallelism for all the DFT-sizes in LTE applications. The radix vector for all the 35 different N_DFTs is arranged to have radix-4 in the last stage (e.g., the (Ns−1)$^{th}$ stage) and either radix-3 or radix-6 for the stage before the last stage (e.g., (Ns−2)$^{th}$ stage). The memory is first folded to support parallel radix-4 operation for the last stage by having a SIMD of multiple of 4. By fixing RV[Ns−1]=4, the SIMD12 memory is divided to 1 or 2 sections depending on the radix factorization vector for the last two stages.

Figure 15:
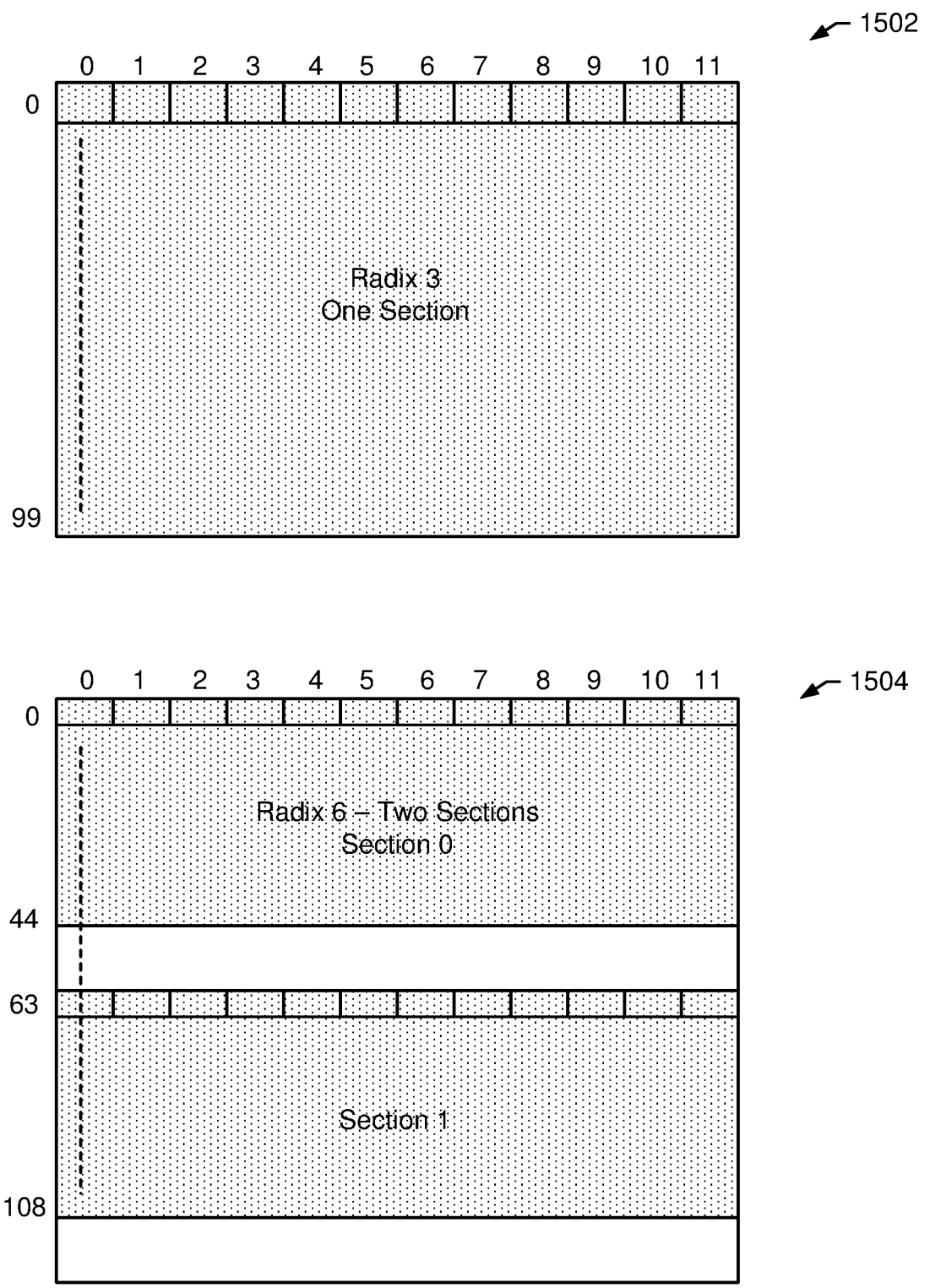
FIG. 15 illustrates exemplary embodiments of memory organizations in accordance with embodiments of the invention.

FIG. 15 illustrates exemplary embodiments of memory organizations in accordance with the exemplary embodiments of the invention. As shown in FIG. 15, in one embodiment, the memory of the memory bank 404 is organized as one section 1502 for the cases of radix vectors {3, 4} in the last two stages of the radix factorization or in two sections 1504 for the case of radix vectors {6,4} in the last two stages of the radix factorization. If (RV[Ns−2]=3) then the 128-entry memory is treated as a single section 1502. If (RV[Ns−2]=6) then the 128-entry memory is treated as two sections 1504. Examples of such radix factorizations include, but are not limited to: {5,3,3,6,4}, {6,6,6,4}, {6,5,6,4}, {5,5,6,4}, {6,4,6,4}.

In an exemplary embodiment, a method to compute the multi-stage DFT/IDFT iteratively in a single common vector radix-engine is summarized as follows:

Phase 1: Input data to the memory bank 404 before the computation is started. Data is written into the memory 404 in a shuffled pattern in this phase. In an exemplary embodiment, the pattern is determined from an InputDataFFT( ) procedure as shown below.

Phase 2: If the number of radix factorization stages is >2, then an iterative process is called for the first (Ns−2) stages as shown in the exemplary procedure DFT_MidStages_Proc( ) shown below.

Phase 3: The procedure for the (Ns−2)$^{th}$ stage is called to do either radix-3, or radix-6 operation.

Phase 4: The last stage procedure is called to do a radix-4 operation. The data is written directly to the output vector buffer after the radix operation.

In an exemplary embodiment, the Vector Memory Address Generation (VMAG) includes address generation for the vector memory including address generation for the following components:

A. Address Generation for the Input Shuffling and Vector Store Stage.
B. Address Generation for the vector load/store of stages before the last two stages.
C. Address Generation for the Stage Before Last.
D. Address Generation for the Last Stage.

An address generation procedure is used for input shuffling and vector store to store data into the vector memory bank 404. In an exemplary embodiment, the address generation in this phase is performed by pseudo-code as shown in the in Table 1. After this phase, the data has been shuffled in the memory 404 into a pattern for independent sub-block DFT computation from smaller size DFTs to the final full size DFT. In an exemplary embodiment, address patterns for two scenarios are demonstrated as shown in the following two examples.

A. 1200-point DFT with a radix factorization of {5,5,4,3,4}. The memory is treated as a single section because the fourth stage has a radix-3 operation.

B. 1080-point DFT with a radix factorization of {5,3,3,6,4}. The memory is treated as two sections (due to radix 6 in fourth stage) to hold the radix-6 data in an SIMD-12 vector memory with a last stage of radix-4.

TABLE 1

Pseudo-code for the Input Shuffling and Vector Store Phase

```
#define MAX_NDFT 1536
#define MAX_NS 6              // Max number of stages in the radix factorization.
#define MAX_NS_M2 MAX_NS -2
#define MB_DEPTH 128          // The depth of the memory bank.
#define SIMD_WIDTH 12         // The SIMD width of the memory bank.
void InputDataFFT(short NFFT, short Radix_Vect[MAX_NS], short NStages, int In[MAX_NDFT], int
MEMBK[MB_DEPTH][SIMD_WIDTH])
{
    Short InAddr = 0;
    int wdIndx, i0, i1, i2, i3;
    int Offi0, Offi1, Offi2;
    int BK_AOff, BK_AOff_P2;   //Memory Bank Address Offset.
    short STEPS[MAX_NS] = {0,};
    short RVectMAX[MAX_NS] = {1,1,1,1,1,1,};    // Radix factorization vector.
    for (i0 =0; i0<NStages-2; i0++){
        RVectMAX[i0] = Radix_Vect[i0];
    }
    STEPS[MAX_NS_M2-2] = Radix_Vect[0];
    for (int SIndx = MAX_NS_M2-2; SIndx >= 1; SIndx --){ //Stage index.
        STEPS[SIndx -1] = STEPS[SIndx] * Radix_Vect[MAX_NS_M2 - SIndx-1];}
    for (i3 = 0; i3<RVectMAX[0]; i3++){
        Offi2 = 0;
        for (i2 = 0; i2<RVectMAX[1]; i2++){
            Offi1 = 0;
            for (i1 = 0; i1<RVectMAX[2]; i1++){
                Offi0 = 0;
                for (i0=0; i0 <RVectMAX[3]; i0++){
                    BK_AOff = i3 + Offi2 + Offi1 + Offi0;
                    for (wdIndx = 0; wdIndx < SIMD_WIDTH; wdIndx++){
                        MEMBK[BK_AOff][wdIndx] = In[InAddr]; InAddr ++;
                    }
                    if ((Radix_Vect[NStages - 2] == 6))
                    {
                        BK_AOff_P2 = BK_AOff + 64;
                        for (wdIndx = 0;wdIndx < SIMD_WIDTH; wdIndx++){
                            MEMBK[BK_AOff_P2][wdIndx] = In[InAddr]; InAddr ++;
                        }
                    }
                    Offi0 = Offi0 + STEPS[0];
                }
                Offi1 = Offi1 + STEPS[1];
            }
            Offi2 = Offi2 + STEPS[2];
        }
    }
}
```

During the write-in process, the data is written into the SIMD12 vector memory bank 404 continuously. The generated address points to the offset address within the memory bank. The offset address will be traced by starting from the last two stages. For example, 12 incoming samples are written continuously into one entry of the SIMD12 memory 404 given by the address (BK_AOff=i3+Offi2+Offi1+Offi0). If there are two memory sections use (e.g., for the case of radix-6 in the (Ns−2)$^{th}$ stage), then after writing the first section, data storage will jump to the same offset address in section 2 as (BK_AOff_P2=BK_AOff+64). Then the AddrOffset addresses are generated iteratively as shown above for the first several stages.

Address Generation for Last Two Stages of DFT Computation

FIGS. 16A-C illustrate an exemplary embodiment of a memory input data pattern for a 1200-point DFT having one section based on a radix factorization where the last two stage of the radix factorization include {x, x, x, 3, 4}. For example, the radix factorization as shown above is {5, 5, 4, 3, 4}. After the shuffling, the data is written into the addresses that allow independent radix-operations across the 12-SIMDs for the first stages. For the example of a 1200-point DFT, the first group of 12-samples are written to addresses with offset of BK_AOff=0 as shown at 1602. The method then continues to write to BK_AOff=25 (shown at 1604), and then to BK_AOff=50 (shown at 1606) and to BK_AOff=75 (shown at 1608) based on the steps generated in the above procedure. The block data from addresses [0-4] is then the radix input to the first stage radix-5 operator. For stage 2, the radix-5 input data will then be picked from a stepped address corresponding to the sub-block as: [0, 5, 10, 15, 20]+i, where i=[0,4] entries. For stage-3, the radix-4 input data will be picked from [0, 25, 50, 75]+j, where j=[0,24]. For stage-4, the radix-3 input data will then be picked from the [W0, W4, W8]+k, where k=[0,3]. For stage-5, the radix-4 input data will then be picked from [W0, W1, W2, W3]+4*l, where l=[0,2]. The detailed procedure for the address generation for each stage is shown later.

FIGS. 17A-D illustrate an exemplary embodiment of a memory input data pattern for a 1080-point DFT having two sections based on a radix factorization where the last two stage of the radix factorization include {x, x, x, 6, 4}. For example, the radix factorization is {5, 3, 3, 6, 4}. For this 1080-point DFT, the memory is partitioned into two sections because the last two stages are radix [6, 4] computations. The first group of 12-samples are written to the first section (Section 1) at addresses with offset BK_AOff=0, as shown at 1702. The data writing continues with the next group written to the second section (Section 2) at addresses with offset BK_AOff_P2=64, as shown at 1704. For both sections, the BK_AOff continues to jump to [30, 45]. The block data from addresses [0-4] is then the radix input to the first stage radix-5 operator. For stage 2, the radix-3 input data will be picked from a stepped address corresponding to the sub-block as: [0, 5, 10]+i, where i=[0,4] entries. And then, for stage-3, the radix-3 input data will be picked from [0, 15, 30]+j, where j=[0,14]. For stage-4, the radix-3 input data will then be picked from the [W0, W4, W8]+k from both sections, where k=[0,3]. For stage-5, the radix-4 input data will then be picked from [W0, W1, W2, W3]+4*l, where l=[0,2] from both sections separately. The detailed procedure for the address generation for each stage is shown later.

Address Generation for Stages Before the Last Two Stages

With the input data already shuffled in the pattern as above, parallel processing of multiple radices can be done by loading the data into the input staging buffer matrix 410 of size DVectREGs[6][12]. The VMS reads the vector data from the memory 404 and into the pipeline 448. The vector data then flows the input staging buffer matrix 410. The address generation is then done iteratively from the radix-vector and the parameters including the number of sectors, number of sub-block size, the current radix size r, and the input sub-block size n. The detailed procedure is shown in the following logic flow.

The address generation is then a nested loop that first goes through the number of sectors, and then the OffsetAddress within one sector, and then the number of independent sub-blocks. This process is repeated for the stages with update to the loop counters and NFFT_CurStage based on the radix vector.

AbsBaseAddr=SECTOR_BASE+BaseAddr+Offf-SetInSBlk

For the 1200-point DFT example with RV=[5,5,4,3,4], the addresses for reading the memory 404 and loading the pipeline 448 for the first three stages are given as follows:

Stage 0: n=1, r=5, NFFT_CurStage=n*r=5, N_SBlks=(5*4*3*4)/12=20 is the number of SIMD-12 sub-blocks for the radix-5 computation. All the radix-5 operations are independent for the 12-SIMD data and there is no need to do twiddle factor multiplication and twiddle factor regeneration. The operation basically produces 20*12 independent 5-point DFTs. For example, a process called:

vLoadDataMBS(CurRadix,AbsBaseAddr,SBSizeIn, DVectREGS)

will load a matrix of data to into the staging buffer (410) DVectREGs[5][12] from the following addresses in the vector memory bank 404:

[0, 1, 2, 3, 4][0 ~ 11],

[5, 6, 7, 8, 9][0 ~ 11],

[10, 11, 12, 13, 14][0 ~ 11],

...

[95, 96, 97, 98, 99][0 ~ 11].

The radix-5 operation is thus straightforward for the data DVectREGs[5][12]. After the radix operation is performed by the radix engine 414, the resulting data will be written back to the same addresses in the memory 404 for each sub-block as in above order. For example, the vector memory address generator 424 generates the appropriate control and address parameters (A) that are provided to the vector store unit 420 to write the results of the radix computations back into the memory 404 at the same addresses.

Stage 1: n=5, r=5, NFFT_CurStage=n*r=25, N_SBlks=N_SBlks/r=4. Thus, the data will be loaded into the staging buffer 410 from the following memory addresses of the memory bank 404 in the following order for the $1^{st}$ sub-block:

[0, 5, 10, 15, 20][0-11],
[1, 6, 11, 16, 21][0-11],
[2, 7, 12, 17, 22][0-11],
[3, 8, 13, 18, 23][0-11],
[4, 9, 14, 19, 24][0-11].

Similarly, the other four sub-blocks are computed as the following order.

[25, 30, 35, 40, 45][0 ~ 11],

[26, 31, 36, 41, 46][0 ~ 11],

...

Stage 2: n=25, r=4, NFFT_CurStage=n*r=100, N_SBlks=N_SBlks/r=1. Thus, the data will be loaded into the staging buffer 410 from the following memory addresses of the memory bank 404 in the following order:

[0, 25, 50, 75][0 ~ 11],

[1, 26, 51, 76][0 ~ 11]

-continued

[2, 27, 52, 77][0 ~ 11]

...

[24, 49, 74, 99][0 ~ 11]

Figure 18:
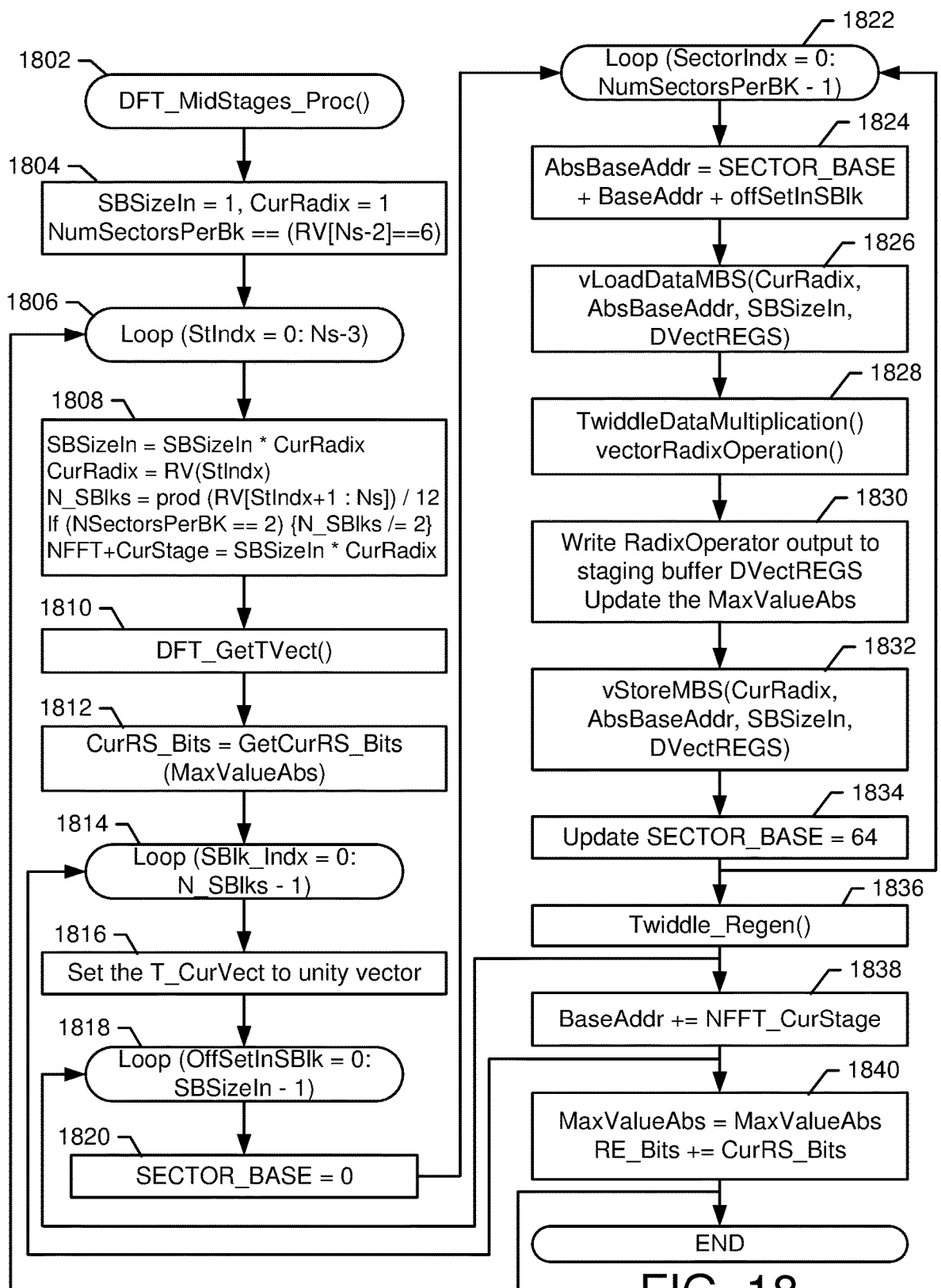
FIG. 18 illustrates an exemplary embodiment of a method for address generation for stages before the last two stages in accordance with the present invention.

FIG. 18 illustrates an exemplary embodiment of a method 1800 for address generation for stages before the last two stages in accordance with one embodiment of the present invention. In an exemplary embodiment, the operations shown below are performed by the VMS described above.

At block 1802, the DFT procedure begins.

At block 1804, values are initialized. For example, values corresponding to the radix factorization, number of sectors per block, current radix value and others as described above are initialized.

At block 1806, a loop on stage index begins.

At block 1808, an update to stage parameters is performed.

At block 1810, a procedure to look up base radix Vect_T (CurRadix, SBSizeIn) is performed.

At block 1812, a variable called curRS_bits is set.

At block 1814, a loop on stage block index begins.

At block 1816, a variable called T_CurVect is set to a unity vector.

At block 1818, a loop on Offset Input stage block begins.

At block 1820, a sector base is set to zero.

At block 1822, a loop on sector index begins.

At block 1824, a base address is computed.

At block 1826, vector data is loaded from the memory to a staging buffer. For example, the vector data passes from the memory 404 through the pipeline 448 to the input staging buffer 410.

At block 1828, a twiddle multiplication is performed on the data and a vector radix operation is performed. For example, the twiddle multiplier 412 performed the twiddle multiplication on the SIMD12 data and the radix engine 414 performs the radix calculation as described above.

At block 1830, the result of the radix calculation is written to the output staging buffer 416.

At block 1832, the result in the output staging buffer is stored in the memory 404. For example, the vector store unit 420 receives the result from the output staging buffer over the feedback path 472 and stores the result into the memory 404 at the same address locations from which the data originated.

At block 1834, the sector base address is updated.

At block 1836, new twiddle factors are generated for the next column of a twiddle matrix. For example, the twiddle factor generator 422 operates to generate new twiddle factors. The new twiddle factors are input to the twiddle multiplier 412.

At block 1838, the base address for the next SBlk is updated.

At block 1840, the MaxValueAbs and Total RE_Bits are updated for the current stage.

Thus, the method 1800 provides for address generation for stages before the last two stages in accordance with one embodiment of the present invention.

Address Generation for Stage Before the Last Stage

The address generation for the last two stages is different from the previous stages because of the use of SIMD12 to allow parallel processing of the last two stages. There are two scenarios for the stage before the last, radix-6 or radix-3 while the last stage is always radix-4. The memory 404 will be accessed by a SECTOR_BASE={0,64} for radix-3 and radix-6, respectively, plus the OffSetInSBlk as shown in the following equation.

AbsBaseAddr=SECTOR_BASE+OffSetInSBlk

Each address points to one SIMD12 entry. The 12 words in one single entry are logically partitioned into 3 portions, each with 4-SIMD words (corresponding to the 3-bank counterpart, which can be referred to as 3 virtual banks). For radix-3, the three inputs are taken from each of the three virtual banks as [0,4,8]+j, where j=[0,3]. So each SIMD12 entry will make 4 parallel radix-3 operations. For the case of radix-6, the 6 inputs will be taken from two sectors of the SIMD12 entries, i.e., the [0,4,8]+j from section 0 and [0,4,8]+j from section 1. The two sections are gapped by 64 in the address space as shown above. The details can be demonstrated by the following two examples.

For the case of radix-3 in the stage (Ns−2), there will be only one section; n=NFFT_CurStage of the previous stage. In the example of a 1200-point DFT, n=100, r=3, NFFT_CurStage=300 for this stage. The operation will simply loop over all the SIMD12 entries to load the 12-SIMD words, and then pack them into four radix-3 inputs. In an exemplary embodiment, the address pattern can be determined from the following:

```
for (OffSetInSBlk = 0 : SBSizeIn−1)
{
    Load from [OffSetInSBlk][0-11];
    ...
}
```

A. [0][0-11]: radix-3 inputs are composed of [0,4,8]+j, j=[0,3] of the same SIMD12 entry.
B. [1][0-11]: radix-3 inputs are composed of [0,4,8]+j, j=[0,3] of the same SIMD12 entry.
. . .
C. [OffSetInSBlk][0-11]: radix-3 inputs are composed of [0,4,8]+j, j=[0,3] of the same SIMD12 entry.
. . .
D. [99][0-11]: radix-3 inputs are composed of [0,4,8]+j, j=[0,3] of the same SIMD12 entry.

For the case of radix-6 in this stage as in the example of a 1080-point DFT, there will be two sections; n=45, r=6, NFFT_CurStage=270 for this stage. In an exemplary embodiment, the address pattern can be determined from the following:

```
for (OffSetInSBlk = 0 : SBSizeIn−1)
{
    SECTOR_BASE = 0;
    short SECTOR_BASE_DVREGS = 0;
    for (SectorIndx = 0 : 1)
    {
        short AbsBaseAddr = SECTOR_BASE + OffSetInSBlk;
        load from [AbsBaseAddr][0-11];
        SECTOR_BASE = 64;
    }
    ...
}
```

As a result, the 6-inputs for the radix-6 operator is loaded from the following addresses:
A. [0][0~11], [64][0~11]: 6-inputs for the radix-6 is composed from two sectors of [0,4,8]+j, j=[0,3].
B. [1][0-11], [1+64][0-11]: same as above, except that the AbsBaseAddr to the memory space is now 1.

C. [2][0-11], [2+64][0-11]
. . .
D. [44][0-11], [44+64][0-11]: same as above, except that the AbsBaseAddr to the memory space is now 44.

Address Generation for the Last Stage

Address generation for the last stage involves the following steps. The loading of the data from the memory 404 to the staging buffer 410 for the last stage first iterates for the number of entries within one section, and then iterates for the number of sections. The SIMD12 samples make the three parallel radix-4 inputs as follows: the samples [0-3], [4-7], [8-11]. Because the input sub-block size n for the last stage is N_DFT/4, to allow the three vector radix processing at the last stage, it is beneficial to prepare three sets of twiddle factor vectors in parallel. In an exemplary embodiment, the twiddle factor is divided in three parts as follows since we have three vector Radix-4s. For each part, two twiddle factors will be generated in parallel incrementally.

$$T_{r \times n} = \left[ \left( \begin{bmatrix} 1 \\ 1 \\ 1 \\ \vdots \\ 1 \end{bmatrix} \begin{bmatrix} 1 \\ W_{r \times n} \\ W_{r \times n}^2 \\ \vdots \\ W_{r \times n}^{(r-1)} \end{bmatrix} \begin{bmatrix} 1 & \cdots & 1 \\ W_{r \times n}^2 & & W_{r \times n}^{(\frac{n}{3}-1)} \\ W_{r \times n}^4 & & \\ \vdots & & \\ W^{2(r-1)} & & W^{(r-1)(\frac{n}{3}-1)} \end{bmatrix} \right) \left( \begin{bmatrix} 1 \\ W_{r \times n}^{\frac{n}{3}} \\ W_{r \times n}^{2(\frac{n}{3})} \\ \vdots \\ W_{r \times n}^{(r-1)\frac{n}{3}} \end{bmatrix} \begin{bmatrix} 1 \\ W_{r \times n}^{\frac{n}{3}+1} \\ W_{r \times n}^{2(\frac{n}{3}+1)} \\ \vdots \\ W_{r \times n}^{(r-1)(\frac{n}{3}+1)} \end{bmatrix} \begin{matrix} 1 & \cdots & 1 \\ & & \\ & & W_{r \times n}^{(\frac{2n}{3}-1)} \\ & & \\ & & W^{(r-1)(\frac{2n}{3}-1)} \end{matrix} \right) \left( \right) \right]_{r \times n},$$

where the decomposition is simply expressed as:

$$T_{r \times n} = \left[ T_{r \times \frac{n}{3}}, \; T_{r \times \frac{n}{3}} \circ (T_{r \times n}^{base})^{\frac{n}{3}}, \; T_{r \times \frac{n}{3}} \circ (T_{r \times n}^{base})^{\frac{2n}{3}} \right]_{r \times n}.$$

Thus, the offset address to the SIMD12 will then grow continuously for each section.

For the output to get in-order address and SIMD4 throughput, the DVectREGS[4][12], in one aspect, is used to stage the output buffer 416. This process is shown for the following examples.

Figure 19:
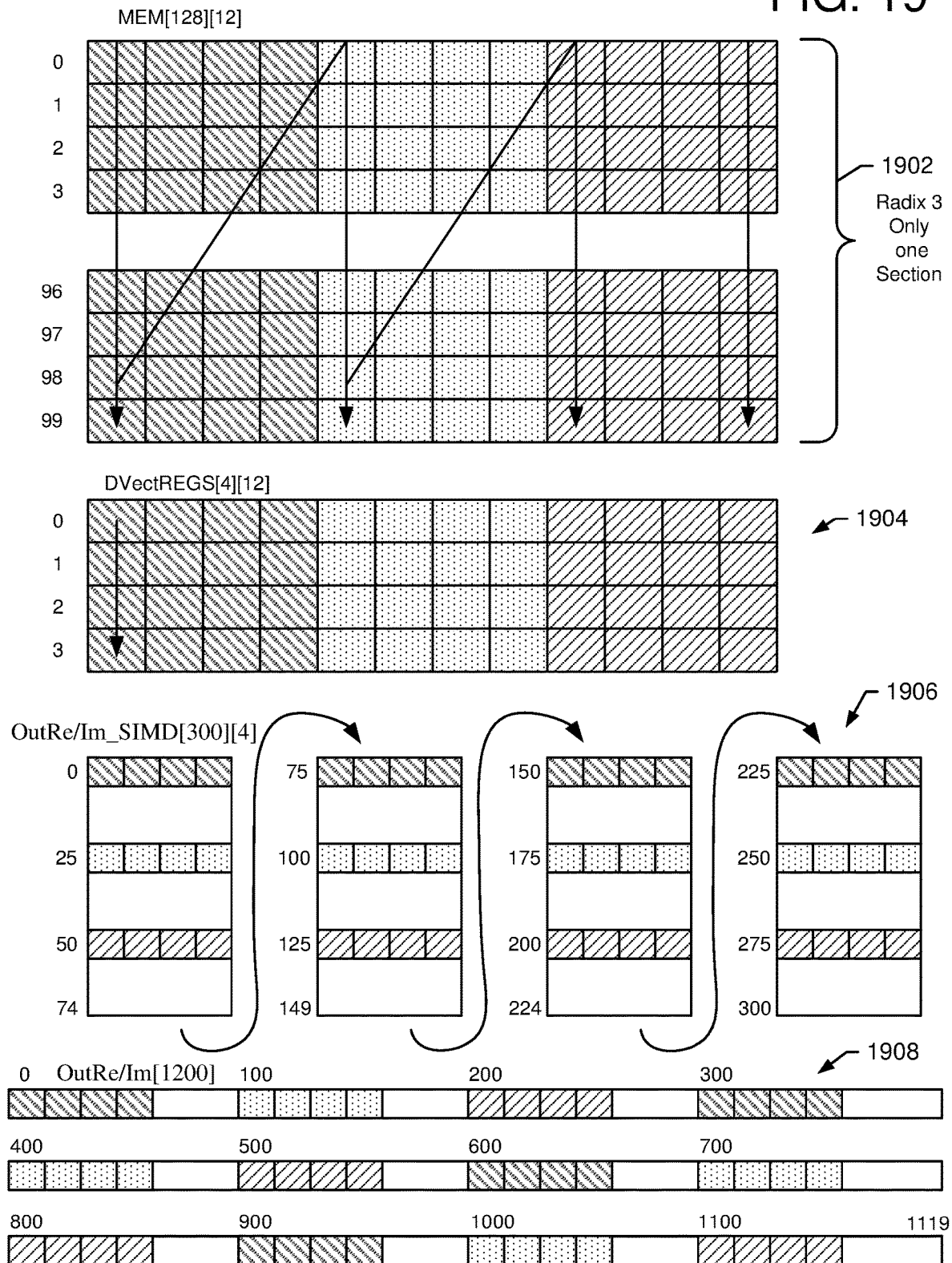
FIG. 19 illustrates exemplary block diagrams of data output patterns for the output to get in-order addresses and SIMD4 throughput in accordance with exemplary embodiments of the present invention.

FIG. 19 illustrates exemplary block diagrams of data output patterns for the output to get in-order addresses and SIMD4 throughput in accordance with exemplary embodiments of the present invention. For the example of 1200-point DFT, the address grows from 0-99 for all SIMD12 entries. The in-order output will take the first column of each virtual bank as shown at 1902. It will then move to the second column. The output of four rows will be stages in the DVectREGS[4][12] (4×3 radix-4 outputs) at the output staging buffer 416 as shown at 1904 and then written directly to the Out_SIMD[300][4] output buffer xxx as shown at 1906. The DVectREGS[4][12] will be direct mapping of the four rows of the MEM[128][12] as an intermediate output buffer. Thus, the mapping from the DVectREGS[4][12] to Out_SIMD[300][4] will be as gapped by the 25 when the contents are read from DVectREGS[4][12] column-wise but written to the OutSIMD[300][4] row-wise as shown at 1908. Each row is a SIMD4 entry. This write process to OutSIMD [300][4] is done in the last stage of computation. After the last stage is done, the OutSIMD[300] [4] will be read out in SIMD4 wise and the output throughput to the Out[1200] will then be 4 samples/cycle.

Figure 20:
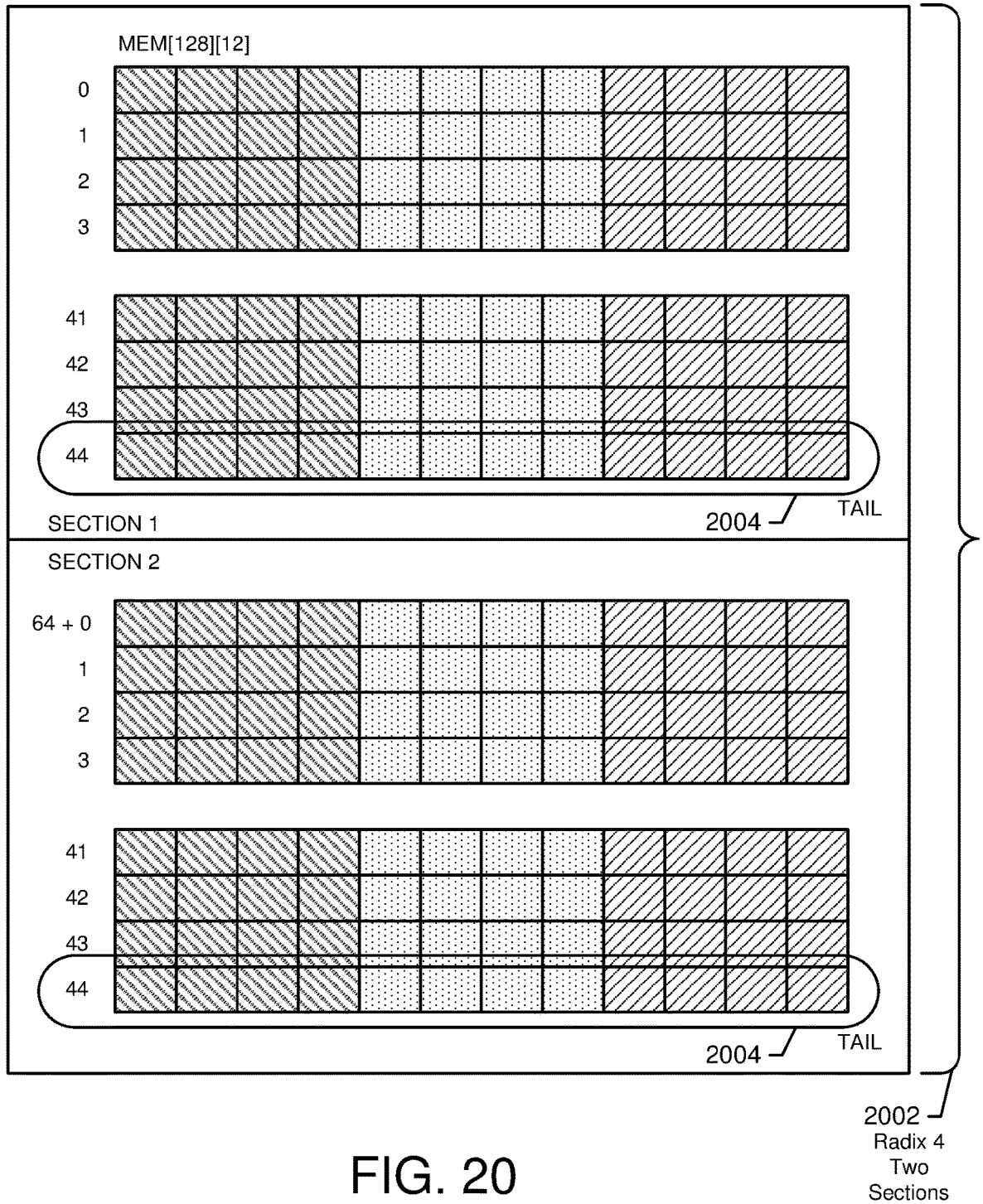
FIGS. 20-21 illustrates exemplary block diagrams of address patterns for the last stage of VMS in accordance with one embodiment of the present invention.
Figure 21:
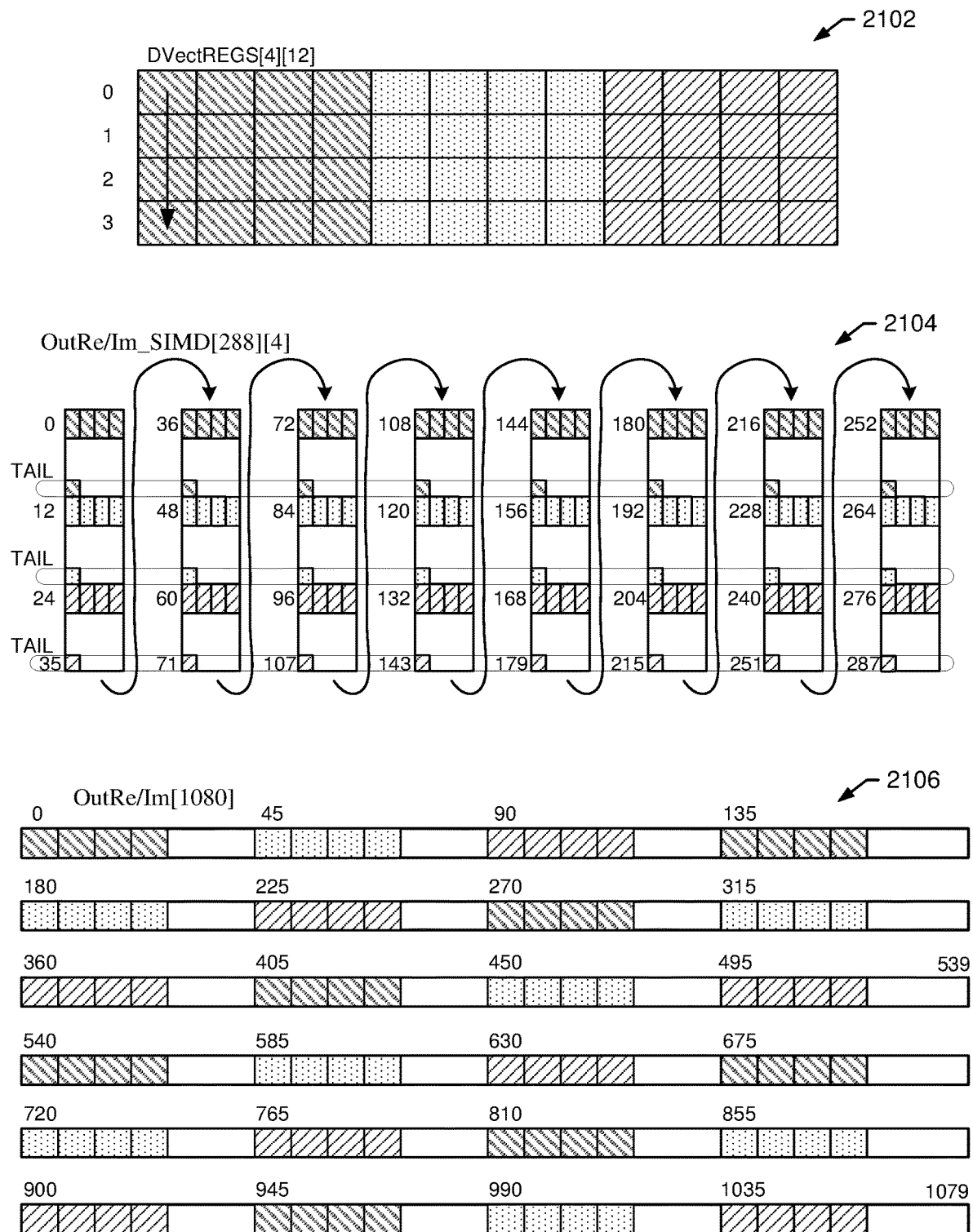

FIGS. 20-21 illustrates exemplary block diagrams of data patterns for the last stage of VMS in accordance with one embodiment of the present invention. For the example of the 1080-point DFT, the last two stages include radix {6,4} computations. Thus, there are two sections as shown in FIG. 20 at 2002. The 2 sections of the SIMD12 (6 radix-4) is equivalent to 6 virtual banks. Since the output is buffered at DVectREGS[4][12] as shown in FIG. 21 at 2102, the address generation for the radix computation is the same as described above, except that the two sections needed to be iterated.

The output to the OutSIMD[288][4] as shown in FIG. 21 at 2104 is also similar to the above description, except that there will be two extra loop for two sections to go over all 6 virtual banks. Specifically, the MEM[128][12] is partitioned into two sections of 45 entries for each. Three radix-4 operations are carried out in parallel for the $1^{st}$ section first, and then the $2^{nd}$ section, with inputs from [0,1,2,3], [4,5,6,7], [8,9,10,11] for the same offset address of both sections. The results are written into the DVectREGS[4][12] in the same place row-by-row. Once four rows are written into the DVectREGS[4][12], the results are read out column by column and written into the OutSIMD[288][4] row by row.

In an exemplary embodiment, a Tail row 2004 exists. It should be noted that 45 is not the multiple of 4, so there is one tail row that will have only one entry instead of four. It will be written into DVectREGS[4][12] for the number of tail rows. The results will be written into the OutSIMD[288] [4] disregarding of the number of tail elements.

In the output phase by reading from OutSIMD[ ][4], however, the tail needs special handling similar to the write to DVectREGS. Specifically, it will only output the valid elements from the tail entry in OutSIMD and discard the other filler elements.

Address Mapping from Staging Buffer to Out_SIMD and the Output Data Stream (2106) is disclosed for the VMS. Note that for the case of 12-point (radix-{3,4}) and 24-point (radix-{6,4}) DFTs, they can be treated as special cases without using the above procedure to generate the output because there is only one row in each section. The output can be easily packed to the needed format to achieve throughput of 3 samples/cycle or 4 samples/cycle. Otherwise, the tail processing only gives 1 sample/cycle, which does not meet the throughput requirement. Table 2 shows an exemplary embodiment of pseudo-code to achieve the last stage processing and data output as described above.

TABLE 1

Pseudo-code for the Last Stage Processing and Data Output.

```
SECTOR_BASE = 0;
NumOutSIMDEntryPerBK = NumEntryPerMB >> 2;
NumEntryPerMB_Mod4 = NumEntryPerMB % 4;
if (NumEntryPerMB_Mod4 != 0)
{
  NumOutSIMDEntryPerBK += 1;
}
short OutWR_SECTOR_BASE = 0;
short BaseDBUF_SIMD;
unsigned short CurRS_Bits;
CurRS_Bits = GetCurRS_Bits(DFT_InParas -> MaxValueAbs);
RS_Bits += CurRS_Bits;
for (SectorIndx = 0 : NumSectorsPerBK-1)
{
    short CurSIMDIndx = 0;
    short OutAddrOff = 0;
    for (short OffSetInSBlk = 0 : NumEntryPerMB-1)
    {
        short AbsBaseAddr = SECTOR_BASE + OffSetInSBlk;
// Step 1: load the data of the same radix from multiple banks and SIMD to the Register files.
        for (j = 0 : CurRadix-1)
        {
            In_MB0[j] = (MEMB0[AbsBaseAddr][j]) >> CurRS_Bits;
            In_MB1[j] = (MEMB0[AbsBaseAddr][j+4]) >> CurRS_Bits;
            In_MB2[j] = (MEMB0[AbsBaseAddr][j+8]) >> CurRS_Bits;
            T_CurFMult[j] = SAT16(T_CurRe[j] >> 2);
            T_CurTmp_MBK1_FMult[j] = SAT16(T_CurReTmp_MBK1[j] >> 2);
            T_CurTmp_MBK2_FMult[j] = SAT16(T_CurReTmp_MBK2[j] >> 2);
        }
        TwiddleMulti(In_MB0, T_CurFMult, CurRadix);
        TwiddleMulti(In_MB1, T_CurTmp_MBK1_FMult, CurRadix);
        TwiddleMulti(In_MB2, T_CurTmp_MBK2_FMult, CurRadix);
// Step 2: do three vector processing of the Radix operations;
        Radix_OneOperators(CurRadix, In_MB0, Out_MB0);
        Radix_OneOperators(CurRadix, In_MB1, Out_MB1);
        Radix_OneOperators(CurRadix, In_MB2, Out_MB2);
        unsigned int MaxValueB0, MaxValueB1, MaxValueB2;
// Write back to Buffer Register Files
        for (j = 0: CurRadix-1)
        {
            DVectREGS_MB0[CurSIMDIndx][j] = Out_MB0[j];
            DVectREGS_MB1[CurSIMDIndx][j] = Out_MB1[j];
            DVectREGS_MB2[CurSIMDIndx][j] = Out_MB2[j];
// update the MaxAbsValue;
            ...
        }
        Twiddle_Regen(T_Cur, T_BaseRadix,CurRadix);// T = T.*T_BaseRadix;
        Twiddle_Regen(T_CurTmp_MBK1, T_BaseRadix,CurRadix);
        Twiddle_Regen(T_CurTmp_MBK2, T_BaseRadix,CurRadix);
        CurSIMDIndx ++;
        if (CurSIMDIndx == 4)
        {
            CurSIMDIndx = 0;
            BaseDBUF_SIMD = 0;
            for (short j = 0 : CurRadix-1)
            {
                for (short i=0; i<4; i++)
                {
                    OutSIMDAddr = BaseDBUF_SIMD + OutWR_SECTOR_BASE +
                        OutAddrOff;
                    OutSIMD[OutSIMDAddr][i] = SAT16(((DVectREGS_MB0[i][j]) *
                        LastST_Scaler) >> RS_LastScalar);
                    OutSIMD[OutSIMDAddr + NumOutSIMDEntryPerBK][i] =
                        SAT16(((DVectREGS_MB1[i][j]) * LastST_Scaler) >>
                        RS_LastScalar);
                    OutSIMD[OutSIMDAddr + NumOutSIMDEntryPerBK*2][i] =
                        SAT16(((DVectREGS_MB2[i][j]) * LastST_Scaler) >>
                        RS_LastScalar);
                }  // for (i)
                BaseDBUF_SIMD += NumOutSIMDEntryPerBK* 3 * NumSectorsPerBK;
            }  // for (short j)
            OutAddrOff ++;
        }  // if (CurSIMDIndx)
    }  // for (OffSetInSBlk)
// Tail processing
    BaseDBUF_SIMD =0;
    for (short j = 0; j<DFT_InParas->CurRadix; j++)
    {
```

TABLE 1-continued

Pseudo-code for the Last Stage Processing and Data Output.

```
        for (short i = 0; i<CurSIMDIndx; i++)
        {
            OutSIMDAddr = BaseDBUF_SIMD + OutWR_SECTOR_BASE + OutAddrOff;
            OutSIMD[OutSIMDAddr][i]= SAT16(((DVectREGS_MB0_I[i][j]) *
                LastST_Scaler) >> RS_LastScalar);
            OutSIMD[OutSIMDAddr + NumOutSIMDEntryPerBK][i] =
                SAT16(((DVectREGS_MB1_I[i][j]) * LastST_Scaler) >>RS_LastScalar);
            OutReSIMD[OutSIMDAddr +NumOutSIMDEntryPerBK*2][i] =
                SAT16(((DVectREGS_MB2_I[i][j]) * LastST_Scaler) >>RS_LastScalar);
        } // for(i)
        BaseDBUF_SIMD += NumOutSIMDEntryPerBK * 3 * NumSectorsPerBK;
    } // for (short j)
    SECTOR_BASE = 64;
    OutWR_SECTOR_BASE = NumOutSIMDEntryPerBK * 3;
    for (CurRadixIndx= 0:CurRadix-1)
    {
        T_Cur[CurRadixIndx]= (int18)(LUT_STEP_LASTSTAGE_COS[CurRadixIndx]) >>
            RS_BITS_LUT;
        T_CurTmp_MBK1[CurRadixIndx] = T_StepRadix[CurRadixIndx];
        T_CurTmp_MBK2[CurRadixIndx] = T_StepRadixRe[CurRadixIndx];
    }
    Twiddle_Regen(T_CurTmp_MBK1, T_Cur, CurRadix);
    Twiddle_Regen(T_CurTmp_MBK2, T_CurTmp_MBK1, CurRadix);
} // for (SectorIndx)
```

With the output data already stored in the SIMD4 output buffer OutSIMD[ ][4], the output phase to the next step computation after DFT is very straightforward, except the special handling needed for the tail SIMD entry, which may not have full SIMD-4 elements to fill that entry.

While particular embodiments of the present invention have been shown and described, it will be obvious to those skilled in the art that, based upon the teachings herein, changes and modifications may be made without departing from this exemplary embodiment(s) of the present invention and their broader aspects. Therefore, the appended claims are intended to encompass within their scope all such changes and modifications as are within the true spirit and scope of these exemplary embodiments of the present invention.

What is claimed is:

1. A programmable device configured to provide discrete Fourier transform ("DFT") and inverse DFT ("IDFT") operations for data processing, comprising:
    a vector data path pipeline configured to generate scaled vector data by scaling input data received from a vector memory bank;
    a finite state machine controller coupled to the vector data pipeline and configured to generate radix engine control signals in accordance a received index value; and
    a programmable vector mixed-radix engine coupled to the finite state machine and capable of being configured in accordance with the radix engine control signals for facilitating producing a radix result in response to the scaled vector data.

2. The device of claim 1, wherein the vector data path pipeline includes a vector load unit, vector dynamic scaling unit, vector input staging buffer, and vector data twiddle multiplier.

3. The device of claim 2, wherein the vector data path pipeline carries twelve data values per clock cycle.

4. The device of claim 2, wherein the vector scaling unit scales vector data from a memory to generate scaled vector data.

5. The device of claim 2, wherein the vector staging buffer stores the scaled vector data in a temporary memory in a first order, and outputs the scaled vector data from the temporary memory in a second order.

6. The device of claim 2, wherein the vector twiddle multiplier multiples the scaled vector data by twiddle factors to form multiplied scaled vector data.

7. The device of claim 1, wherein the programmable vector mixed-radix engine is configurable to perform a selected radix computation selected from a plurality of radix computations for generating the radix result.

8. The device of claim 7, wherein the plurality of radix computations includes radix3, radix4, radix5, and radix6 computations.

9. The device of claim 1, further comprising an output staging buffer configured to buffer one or more radix results.

10. The device of claim 1, further comprising a vector feedback path coupled to the programmable vector mixed-radix engine and configured to pass the radix result to a vector store unit.

11. The device of claim 10, wherein the vector store unit stores the radix result in a vector memory bank.

12. A data processing device configured to provide discrete Fourier transform ("DFT") and inverse DFT ("IDFT") operations for data processing, comprising:
    a vector input shuffling controller configured to receive input data from external component;
    a configuration look up table ("LUT") coupled to the vector input shuffling controller and configured to store index values selectable by an input index; and
    a finite state machine controller coupled to the configuration LUT and configured to instruct the vector input shuffling controller how to store the input data in a vector memory based on an index value, the finite state machine controller configured to determine size (N) of DFT/IDFT for facilitating programming a programmable vector mixed-radix engine in accordance with the index value.

13. The device of claim 12, further includes a vector data path pipeline configured to generate scaled vector data by scaling input data received from a vector memory bank.

14. The device of claim 12, wherein the programmable vector mixed-radix engine is capable of being configured in accordance with the radix engine control signals for facilitating producing a radix result in response to the scaled vector data.

15. The device of claim 12, further comprising a vector data path pipeline coupled to the finite state machine controller and configured to receive the vector data from a memory.

16. The device of claim 15, wherein the vector data path pipeline carries twelve data values per clock cycle.

17. The device of claim 15, wherein the vector data path pipeline includes a vector scaling unit that scales the vector data to generate scaled vector data.

18. A method of providing a discrete Fourier transform ("DFT") and inverse DFT ("IDFT") operation for data processing, comprising:

receiving an index from an external component;

selecting one of index values representing size of DFT/IDFT listed in a configuration look up table ("LUT") based on the index;

instructing a vector input shuffling controller how to store input data in a vector memory based on selected index value; and facilitating to program a programmable vector mixed-radix engine in accordance with the index value.

19. The method of claim 18, further comprising generating input memory addresses for storing input data into a vector memory bank and generating output memory addresses for retrieving vector data from the vector memory bank to compute radix factors of the radix factorization.

20. The method of claim 18, further comprising staging the vector data from the memory bank and staging outputs of vector data from a temporary memory.

* * * * *